United States Patent [19]

Kamada et al.

[11] Patent Number: 4,789,903
[45] Date of Patent: Dec. 6, 1988

[54] INTEGRATED READER/RECORDER

[75] Inventors: Takeshi Kamada, Atsugi; Shuichi Takahashi, Sagamihara, both of Japan

[73] Assignee: Ricoh Company, Ltd., Tokyo, Japan

[21] Appl. No.: 921,263

[22] Filed: Oct. 21, 1986

[30] Foreign Application Priority Data

| Oct. 21, 1985 | [JP] | Japan | 60-233460 |
| Oct. 21, 1985 | [JP] | Japan | 60-233461 |
| Oct. 31, 1985 | [JP] | Japan | 60-242830 |
| Oct. 31, 1985 | [JP] | Japan | 60-242831 |
| Oct. 31, 1985 | [JP] | Japan | 60-242832 |
| Nov. 12, 1985 | [JP] | Japan | 60-251915 |
| Nov. 12, 1985 | [JP] | Japan | 60-251916 |
| Nov. 27, 1985 | [JP] | Japan | 60-265060 |
| Nov. 27, 1985 | [JP] | Japan | 60-265061 |

[51] Int. Cl.$^4$ .................................... H04N 1/21
[52] U.S. Cl. .................................... 358/296; 358/286
[58] Field of Search ............ 358/296, 285, 286, 293; 346/107 R

[56] References Cited

U.S. PATENT DOCUMENTS 4,630,127 12/1986 Fuwa .................................... 358/285
4,635,130 1/1987 Oi .................................... 358/285

Primary Examiner—Clifford C. Shaw
Attorney, Agent, or Firm—Oblon, Fisher, Spivak, McClelland & Maier

[57] ABSTRACT

An input/output or reading/recording device includes an optical reader and a thermal recorder which are both fixedly mounted on a head unit integrally as spaced apart from each other, with the optical reader upstream of the recorder. A feed roller, which is driven to rotate, is pressed against the head unit and it is positioned to be pressed against the optical reader during a reading mode and against the recorder during a recording mode. Depending on the current mode of operation, an original document to be read or a recording medium to be recorded is passed between the head unit and the feed roller. Since the optical reader is located upstream of the recorder, when the device is operating in the recording mode, the optical reader can be activated at least partly to monitor the recording medium during the recording mode of operation.

30 Claims, 20 Drawing Sheets

① DETECTION

② ③ NO DETECTION

④ DETECTION

INTEGRATED READER/RECORDER

BACKGROUND OF THE INVENTION

1. Field of the Invention

This invention generally relates to an input/output device for use in various machines, such as facsimile machines, for inputting and outputting required information, and, in particular, to an input/output device having a reading section for optically reading information and a recording section for recording information on a recording medium.

2. Description of the Prior Art

A facsimile machine is well known in the art and is widely used. A facsimile machine has dual functions: a reading function for optically reading image information from an original document so as to transmit it to a receiver at a remote location and a recording function for recording information received from a transmitter at a remote location on a recording medium. For this purpose, it is required that the facsimile machine be provided with a path for transporting an original document to be read and another path for transporting a recording medium to be recorded. The prior art facsimile machine is typically provided with two separate transporting paths, one for original documents and the other for recording paper, which hinders to make the machine compact in size. In addition, the prior art facsimile machine is typically provided with a paper sensor for sensing the presence or absence of, the remaining amount of and/or the trailing edge of recording paper. Such a paper sensor is a separate element normally disposed between a paper feeding section and a recording section. The provision of such a separate paper sensor also hinders the making of the machine smaller in size and lower at cost.

SUMMARY OF THE INVENTION

In accordance with the present invention, there is provided an input/output device having a reading section and a recording section, which shares a common path for transporting an original document and a recording medium, whereby the reading section is located upstream of said recording section with respect to the direction of transportation of said original document or recording medium through said common path. Preferably, the input/output device has an integrated structure. In one embodiment, the input/output device includes a head unit which includes a supporting plate in which the reading and recording sections are integrally provided. The input/output device also includes a common feed roller which may be pressed against the head unit, so that either an original document or recording paper is transported along the common path as sandwiched between the head unit and the common feed roller. The relative positional relation between the head unit and the common feed roller is varied under control such that either one of the reading and recording sections is selectively brought into an operative position.

The reading section typically includes a plurality of light-emitting elements, such as LEDs, and a plurality of light-receiving elements, such as photodiodes, each arranged in the form of a linear array extending in the direction transverse to the direction of transportation as the common transportation path. Since an original document and recording paper are selectively transported through the common transportation path, the reading section can be used not only for reading the original document, but also for detecting various conditions of recording paper in transportation.

It is therefore a primary object of the present invention to obviate the disadvantages of the prior art as described above and to provide an improved input/output device.

Another object of the present invention is to provide an input/output device suitable for use in a facsimile machine and the like, thereby allowing to make the machine compact in size.

A further object of the present invention is to provide an input/output device compact in size, reliable and fast in operation, and easy in maintenance.

A still further object of the present invention is to provide an input/output device simple in structure and low at cost, and, thus, suitable for applications to various machines, including facsimile machines.

Other objects, advantages and novel features of the present invention will become apparent from the following detailed description of the invention when considered in conjunction with the accompanying drawings.

DESCRIPTION OF THE PREFERRED EMBODIMENTS

Figure 1:
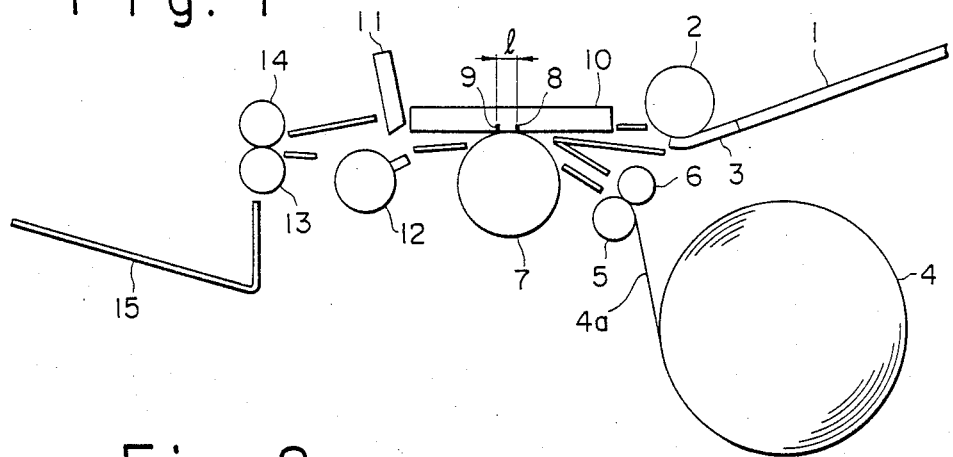
FIG. 1 is a schematic illustration showing an input output device constructed in accordance with one embodiment of the present invention suitable for application to a facsimile machine.

Referring now to FIG. 1, there is schematically shown an input/output device constructed in the form of an integrated reader/recorder in accordance with one embodiment of the present invention. This illustrated structure is particularly suitable for use as a part of a facsimile machine. As shown, the illustrated device includes a table 1 for holding thereon a stack of original documents to be read. At the forward end of the table 3 is disposed a document separation roller 2 and a document separating member 3, which together serve to separate and feed the bottommost document from the stack of original document. That is, with the provision of the separating roller 2 and member 3, original documents placed on the table 1 in the form of a stack are insured to be fed one by one. Below the table 1 is disposed a roll 4 of recording paper, which is unwound to supply recording paper 4a to be used for recording information thereon. Although not shown specifically, it should be understood that the roll 4 is rotatably supported so as to allow to supply recording paper 4a as being unwound therefrom. A supply roller 5 is provided at a location close to the unwinding position of the roll 4, and a tension roller 6 is also provided as pressed against the supply roller 5, so that the recording paper 4a unwound from the roll 4 is sandwiched between these two rollers 5 and 6. Typically, the supply roller 5 is driven to rotate intermittently, so that the recording paper 4a may be unwound from the roll 4 and supplied to a recording section as will be described more in detail later.

Also provided is a common feed roller 7 which is driven to rotate intermittently for moving either an original document or recording paper. Opposite to the common feed roller 7 is disposed an integrated head unit 10 which is integrally provided with a reading section 8 and a recording section as spaced apart over a distance l in the direction of transportation. As will be described more in detail later, it should be noted that the reading section 8 is located upstream of the recording section 9 with respect to the direction of transportation. The common feed roller 7 is preferably pressed against the head unit 10 and the contact surface between the common feed roller 7 and the head unit 10 defines a common path for transporting either an original document or recording paper selectively. Described more in detail, the common transportation path is defined between the common feed roller 7 and the head unit 10, and a first feed path for feeding an original document to the common transportation path extends from the separator roller 2 to the common transportation path and a second feed path for feeding recording paper 4a to the common transportation path extends from the supply roller 5 to the common transportation path. Thus, the first and second feed paths merge into the common transportation path defined between the common feed roller 7 and the head unit 10.

A cutter unit including a stationary blade 11 and a rotary blade 12 is disposed downstream of the common feed roller 7 with respect to the direction of transportation along the common transportation path. Furthermore, a discharging roller 13 is disposed downstream of the cutter unit with respect to the direction of transportation along the common transportation path. A tension roller 14 is provided as pressed against the discharging roller 13. A tray 15 is provided to receive thereon an original document or recording paper discharged out of the common transposrtation path by the discharging roller 13 in cooperation with the tension roller 14. Thus, original documents and/or cut sheets of recording paper 4a are stacked on the tray 15.

In operation, during a read mode of operation, original documents placed on the table 1 in the form of a stack are separated and fed one by one through the cooperation between the separator roller 2 and the separating member 3 and each of the original documents is transported through the common transportation path by the common feed roller 7. And, while the original document is being transported by the common feed roller 7, it is optically read by the reading section 8, and, then, the original document is discharged out onto the tray 15 by means of the discharging roller 13. During read mode, the cutter unit including the stationary and rotary blades 11 and 12 are normally held inoperative. It is to be noted that when read mode is selected, the relative positional relation between the common feed roller 7 and the head unit 10 is so set that the common feed roller 7 is directly opposite to and, preferably, in contact with the reading section 8 of the head unit 10. In the case where the home position of the common feed roller 7 is set at the center between the reading and recording sections 8 and 9, then the feed roller 7 is moved to the right over a distance of ½ so as to establish a read mode condition. It should be noted, however, that the head unit 10 may be moved to the left over a distance corresponding to ½ or both of the common feed roller 7 and the head unit 10 may be moved so as to bring the common feed roller 7 and the reading section 8 in an opposed relation.

On the other hand, when a recording mode of operation is selected, either the common feed roller 7 is moved to the left or the head unit 10 is moved to the left over a distance of ½, or both of the common feed roller 7 and the head unit 10 are moved to bring the common feed roller 7 directly opposite to the recording section 9 of the head unit 10. Preferably, the common feed roller 7 is brought into pressure contact with the recording section 9 of the head unit 10 when recording mode is selected. The recording section 9 may have any desired structure, but, in one embodiment, it includes a plurality of heat-producing elements, such as electrical resistors, arranged in the form of a linear array extending in the direction transverse to the direction of transportation of recording paper. When the recording section 9 has such a thermal printhead structure, the recording paper 4a must be of heat-sensitive nature or heat-sensitive tape must be used between the recording section 9 and the paper 4a if the paper 4a is not of the heat-sensitive type.

During recording mode, the separator roller 2 is held inoperative, and the supply roller 5 is driven so that the recording paper 4a is unwound from the roll 4 and fed into the common transportation path defined between the common feed roller 7 and the head unit 10 or the recording section 9 of the head unit 10 in the present mode. When the leading edge of the recording paper 4a has reached the contact between the common feed roller 7 and the head unit 10, the recording paper 4a is caused to move along the common feed path while being pressed against the recording section 9 to which an image signal to be recorded is supplied. When the recording paper 4a has advanced over a predetermined distance beyond the cutter unit comprised of the stationary and rotary blades 11 and 12, the cutter unit is activated so that the recording paper 4a is severed to a desired length, and, then, this cut sheet of recording paper 4a is discharged out onto the tray 15 by means of the discharging roller 13. After cutting, the common feed roller 7 and the supply roller 5 are driven to rotate in the reverse direction until the leading edge of the recording paper 4a of the roll 4 has been moved back to a position between the rollers 5 and 7, i.e., in the second feed path defined between the rollers 5 and 7. Thus, the recording paper 4a would not interfere with the operation of transporting an original document when the read mode of operation is selected next time.

As described above, in the input/output device of the present invention, provision is made of the head unit 10 integrally provided with the reading and recording sections 8 and 9 and of the common feed roller 7. The relative positional relation between the common feed roller 7 and the head unit 10 is varied to establish either read mode or recording mode selectively. In the illustrated embodiment, both of the reading and recording sections 8 and 9 are provided at a flat bottom surface of the head unit 10, so that it is only necessary to move at least one of the common transportation roller 7 and the head unit 10 relative to each other at least in the horizontal direction. Thus, both of the reading and recording sections 8 and 9 share the common transportation path which is commonly used for transporting either an original document or recording paper 4a selectively. Besides, the common transportation roller 7 is commonly used for transporting either an original document or recording paper. As a result, many elements are commonly used both for reading and recording operations in the illustrated structure, which then allows to make the entire structure compact in size at lower cost.

Figure 2A:
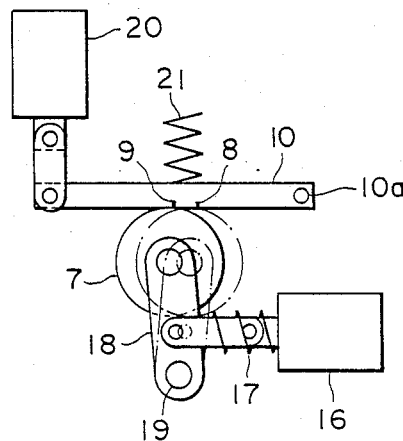
FIGS. 2a through 2c are schematic illustrations showing changes in the relative positional relation between the reading and recording sections.

FIG. 2a shows an embodiment which is so structured that the common transportation roller 7 may be moved horizontally with respect to the reading and recording sections 8 and 9 provided in the head unit 10. In this embodiment, the common feed roller 7 is rotatably supported at a top end of a lever 18 which has its bottom end pivottally supported by a pivot pin 19. The lever 18 is operatively coupled to a solenoid 16 and is normally biased toward the left by means of a spring 17. Thus, the common feed roller 7 is normally biased to take a position indicated by the solid line where the common feed roller 7 is pressed against the recording section 9, thereby establishing the recording mode . On the other hand, when the solenoid 16 is activated, the lever 18 is moved closer to the solenoid until the common feed roller comes to be located at a position indicated by the one-dotted line where the common feed roller 7 is pressed against the reading section 8 to establish the read mode. In the illustrated embodiment, the head unit 10 integrally provided with the reading and recording sections 8 and 9 spaced apart from each other is pivotally supported by a pivot pint 10a at one end and has its opposite end operatively coupled to another solenoid 20. In addition, a spring 21 is provided and its one end is connected to a fixed position, such as a frame (not shown) of the input/output device, and its other end connected to the head unit 10, so that the head unit 10 is normally pressed against the common feed roller 7 under the force of the spring 21. In this embodiment, the solenoid 20 is temporarily activated to move the head unit 10 away from the common feed roller 7 while the common feed roller 7 moves between the two positions: reading and recording positions.

The solenoid 20 can serve another function when it is provided as illustrated. That is, when the leading edge of an original document or recording paper 4a comes around, the solenoid 20 is temporarily activated to move the head unit 10 separated away from the common feed roller 7, thereby insuring that the original document of recording paper 4a can be properly inserted between the common feed roller 7 and the head unit 10. It is to be noted, however, that the solenoid 20 may be discarded, if desired.

Figure 2B:
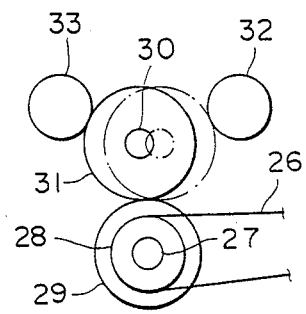

FIG. 2b shows an embodiment of transmitting a rotational force to the common feed roller 7. In the illustrated embodiment, rotational power is first transmitted from a motor (not shown) to a pulley 27 fixedly mounted on a first shaft 27 by means of a belt 26. A gear 29 is also fixedly mounted on the first shaft 29 and it is in mesh with another gear 31 which is fixedly mounted on a second shaft 30, on which the common feed roller 7 is also fixedly mounted. Since the gears 29 and 30 remain meshed irrespective of the pivotal motion of the common feed roller 7 by the lever 18, the common feed roller 7 may be driven to rotate in any desired direction. Also shown in FIG. 2b is a pair of auxiliary gears 32 and 33 which are provided at respective fixed positions, and the gear 31 comes to be in mesh with the auxiliary gear 32 when the common feed roller 7 is located at the reading position, i.e., in contact with the reading section 8 of the head unit 10, whereas, the gear 31 comes to be in mesh with the auxiliary gear 33 when the common feed roller 7 is located at the recording position to be in contact with the recording section 9 of the head unit 10. Thus, preferably, the auxiliary gear 32 is operatively coupled to the separator roller 2 through a power transmission train (not shown), and the other auxiliary gear 33 is operatively coupled to the supply roller 5 through another power transmission train (not shown).

Figure 2C:
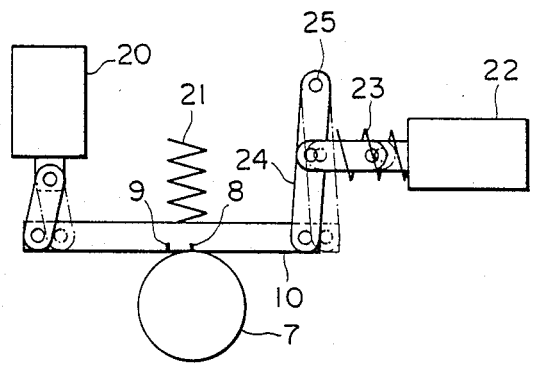

FIG. 2c shows an embodiment in which the head unit 10 provided with the reading and recording sections 8 and 9 is movable and the common feed roller 7 is fixed in position. In this embodiment, the head unit 10 has its left end operatively coupled to the solenoid 20 and its left end operatively coupled to a further solenoid 22 through a lever 24 which has its bottom end pivotally connected to the right end of the head unit 10 and its top end pivotally supported by a pivot pin 25. The head unit 10 has its bottom surface provided with the reading and recording sections 8 and 9 pressed against the common feed roller 7 under the force of the spring 21, and the head unit 10 is also normally biased toward the left by means of a spring 23. As a result, the head unit 10 is normally biased to take the position indicated by the solid line, in which case the reading section 8 of the head unit 10 is in contact with the common feed roller 7. On the other hand, when the solenoid 22 is activated, the head unit 10 is moved to the right to take the position indicated by the one-dotted line, so that the recording section 9 comes to be in contact with the common feed roller 7.

In the above-described embodiments, use is made of solenoids and pivots. However, it should be noted that various other mechanisms, such as cams, may also be used to carry out required relative motion between the common feed roller 7 and the head unit 10.

Figure 3:
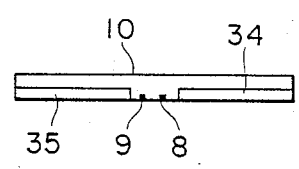
FIG. 3 is a schematic illustration showing a head unit suitable for use in the structure shown in FIG. 1.

FIG. 3 schematically illustrates the basic structure of the head unit 10 suitable for use in the structure shown in FIG. 1. As shown, the head unit 10 is generally comprised of a flat plate on which the reading and recording sections 8 and 9 are fixedly mounted. A read driver circuit 34 and a recorder driver circuit 35 are also fixedly mounted on the flat plate. Thus, the head unit 10 in this embodiment has an integral structure having both reading and recording functions. It is to be noted that, in the illustrated embodiment, the flat plate has a substantially flat bottom surface and the reading and recording sections 8 and 9 are provided at the bottom surface of the plate as spaced apart from each other over a predetermined distance.

It should be noted that in accordance with one feature of the present invention, the integrated head unit 10 is so arranged that its reading section 8 is locted upstream of the recording section 9 with respect to the direction of transportation defined in the common transportation path. With this arrangement, the reading section 8 can be used not only for optically reading an original document, but also for detecting predetermined conditions of recording paper, such as detection of the leading edge and/or trailing edge, when cut in the form of a sheet, and detection of the remaining amount of the recording paper. In addition, the reading section 8 also can be used to detect whether the recording paper being transported is skewed, to detect the size of the recording paper being transported, and to detect the length of time expended for transporting the recording paper.

Figure 4A:
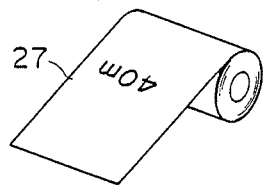
FIGS. 4a and 4b are schematic illustrations showing examples of a mark indicating the remaining amount of a roll of recording paper for use in the structure shown in FIG. 1.
Figure 4B:
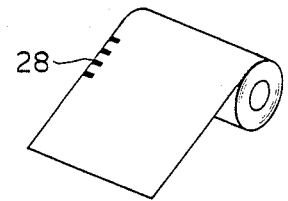

FIGS. 4a and 4b show two examples how the remaining amount of recording paper 4a may be detected using the reading section 8 of the present head unit 10. In the case of FIG. 4a, a set of characters "40 m" 27 indicating the amount of remaining recording paper is written on the recording paper at the center by a predetermined color, such as yellow, which does not interfere with the color used for recording information on the recording paper 4a. On the other hand, in the case of FIG. 4b, a marker 28 is provided along one side of the recording paper 4a. Such characters 27 or marker 28 may be optically read by the reading section 8 of the head unit 10 during recording mode of operation.

As briefly described above, the reading section 8 of the head unit 10 of the present input/output device can be used to determine predetermined conditions regarding the recording paper 4a during the recording mode. This aspect of the present invention will now be described in detail below. It will be assumed in the following description that the reading section 8 of the head unit 10 is of the intimate contact type so that an object to be read by the reading section 8 must be brought into close contact therewith. Thus, an object to be read is preferably brought into pressure contact with the reading section 8. In general, in an optical reading unit of the intimate contact type, an associated feed roller typically has a peripheral surface which is white in color or a similar color, as described in Japanese Patent Laid-open Pub. No. 58-73275. In the present embodiment, the common feed roller 7 is assumed to have a peripheral surface which has a white or similar color.

Figure 5A:
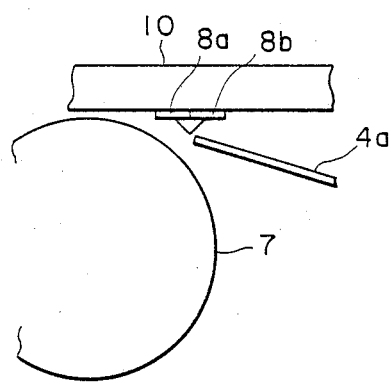
FIGS. 5a through 5c are schematic illustrations useful for explaining the detection function provided by the reading section 8 in the structure shown in FIG. 1.

As shown in FIG. 5a, the reading section 8 of the head unit 10 typically includes a light-emitting or light source subsection and a light-receiving or sensor subsection 8b. The light-emitting subsection 8a typically includes a plurality of light-emitting elements, such as light-emitting diodes, arranged in the form of a linear array, and the light-receiving subsection 8b typically includes a plurality of light-receiving elements, such as photodiodes, arranged in the form of a linear array.

Figure 5B:
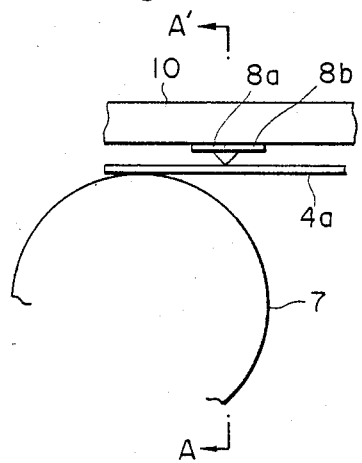
Figure 5C:
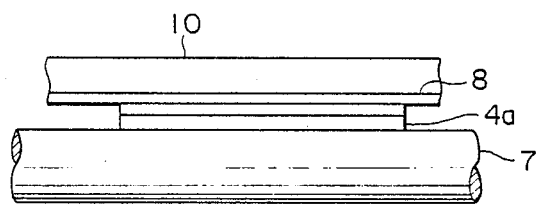

Thus, when the leading edge of the recording paper 4a approaches the reading section 8 as shown in FIG. 5a, the light emitted from the light-emitting subsection 8a comes to be reflected more into the light-receiving subsection 8b. Thus, the amount of light received by the light-receiving subsection 8b differs depending on whether the recording paper 4a is present in the vicinity of the reading section 8 or not, and this fact may be utilized to detect the presence or absence or the leading edge or trailing edge of the recording paper 4a. FIG. 5a shows the case of detecting the leading edge of the recording paper 4a. On the other hand, FIG. 5b shows the case in which the surface of the recording paper 4a is optically read by the reading section 8, so that any sign or mark, indicating, for example, the remaining amount, on the recording paper 4a may be read. FIG. 5c is a view when taken as indicated by A—A40 in FIG. 5b. As shown in FIG. 5c, due to optical scanning of the light-receiving subsection 8b in the main direction or widthwise direction of the recording paper 4a, the side edges of the recording paper 4a may be optically determined. That is, an output signal of the reading section 8 is an analog signal whose level varies depending on the intensity of the light received by the light-receiving subsection 8b. Since the light received by that portion of the light-receiving subsection 8b which is opposite to the recording paper 4a is higher in intensity than the rest, when the output signal of the reading section 8 is subjected to thresholding operation, that portion of the light-receiving subsection 8b which corresponds to the recording paper 4a may be indicated to be white or one of the two binary states and the rest may be indicated to be black or the other binary state. In the preferred embodiment, a microprocessor (not shown) is provided and the data collected by the light-receiving subsection 8b is supplied to the microprocessor for determining the current conditions of the recording paper 4a.

(a) Monitoring Processing Time for Recording Paper

Figure 6A:
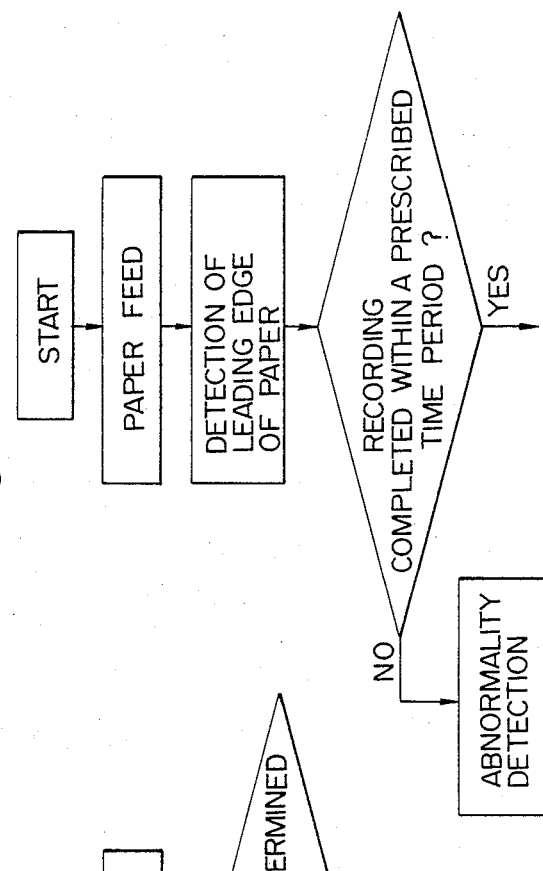
FIGS. 6a through 6c are flow and timing charts which are useful for understanding some of the detection functions provided by the structure shown in FIG. 1.
Figure 6B:
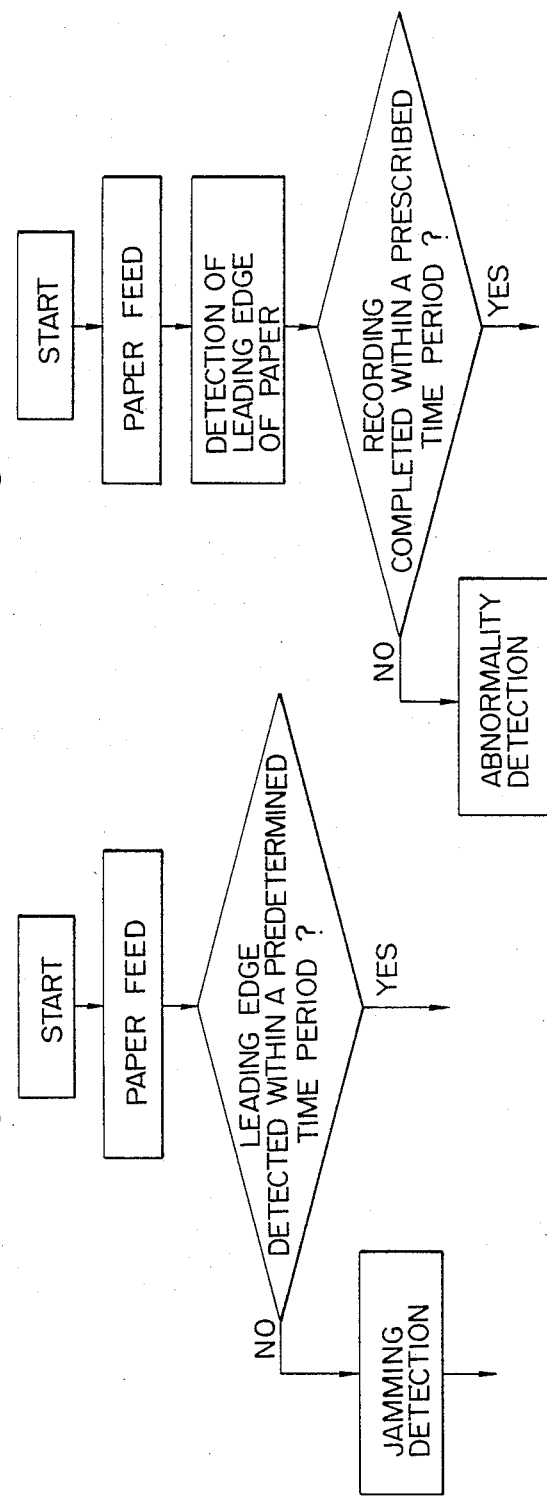
Figure 6C:
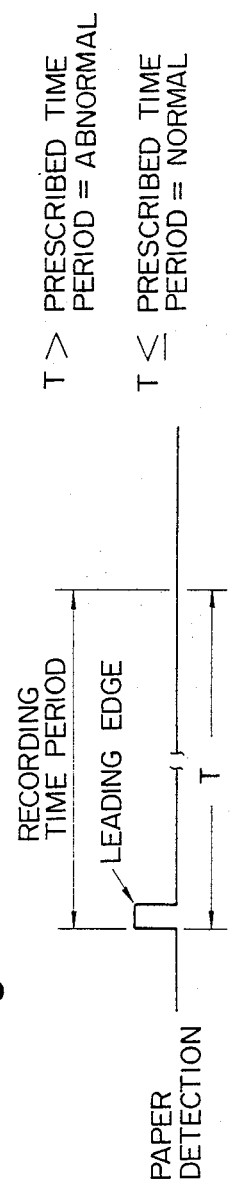

The leading edge of the recording paper 4a is initially located at a predetermined position between the supply roller 5 and the common feed roller 7 in the structure shown in FIG. 1. Upon initiation of the recording mode of operation, the recording paper 4a is caused to move at a predetermined speed over a predetermined amount. In this case, however, if the reading section 8 has failed to detect the leading edge of the recording paper 4a within a predetermined time period, it is determined that some abnormal condition has occurred in the transportation system so that detection of jamming is activated, as shown in the flow chart of FIG. 6a. On the other hand, even if the leading edge of the recording paper 4a has been properly detected, and, thus, the recording operation by the recording section 9 has initiated, if the recording operation has continued beyond a predetermined time period, it is determined that some abnormal condition has occurred so that the occurrence of abnormality is indicated. In this manner, a maximum recording time period is previously set and when this limit has been exceeded, it is determined that some faulty operation has occurred. In this case, such a condition may be determined by monitoring the amount of the recording paper 4a transported or the time required for transporting the recording paper 4a. As shown in FIG. 6c, after detection of the leading edge of the recording paper 4a, if the recording operation has continued beyond a predetermined maximum time period, then it is determined that the operation is faulty.

(b) Detecting the Conditions of Recording Paper

Figure 7A:
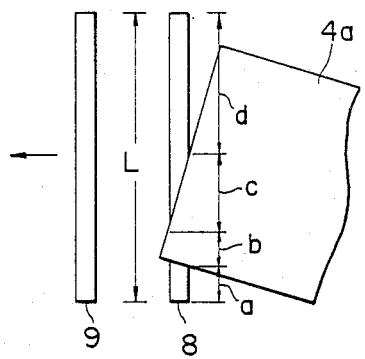
FIGS. 7a and 7b are illustrations useful for understanding the paper skew detecting function provided by the structure shown in FIG. 1.
Figure 7B:
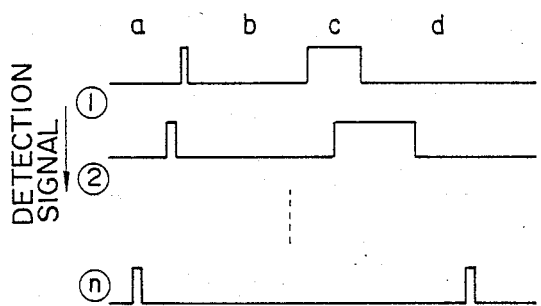

The presence or absence of recording paper 4a at a predetermined position may be effected, for example, by detecting the leading and trailing edges of the recording paper 4a. As shown in FIG. 6c, the time period T indicates a time period during which the recording paper 4a is present at the recording station. The degree of skew of recording paper 4a may be detected by the reading section 8 as shown in FIGS. 7a and 7b. If the recording paper 4a moves past the reading section 8 as transported in the direction indicated by the arrow with a skew as indicated in FIG. 7a, a detection signal obtained from the reading section 8 varies in a timed sequence as shown in FIG. 7b. It is apparent that the presence or degree of skew of the recording paper 4a may be detected by appropriately processing these signals.

(c) Detecting the Size of Recording Paper

Figure 8A:
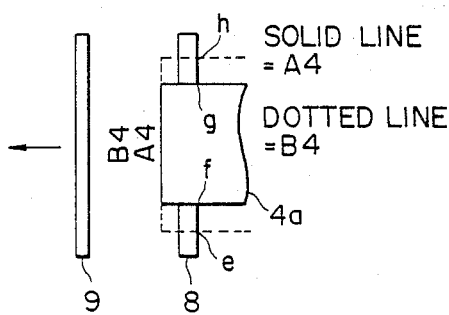
FIGS. 8a and 8b are illustrations useful for understanding the paper width detecting function provided by the structure shown in FIG. 1.
Figure 8B:
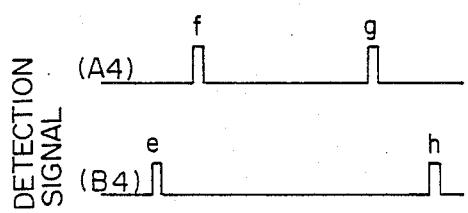
Figure 9A:
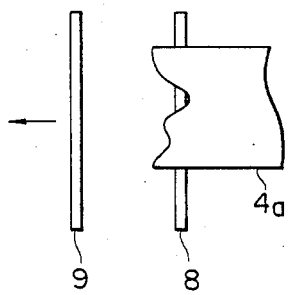
FIGS. 9a and 9b are illustrations useful for understanding the roughened paper edge detecting function provided by the structure shown in FIG. 1.
Figure 9B:
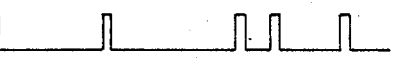

One example of detecting the size of the recording paper 4a using the reading section 8 of the head unit 10 is illustrated in FIGS. 8a and 8b. As is obvious from these figures, the size or width of the recording paper 4a being transported may be determined by obtaining and processing a pair of side edges signals which are produced by the reading section 8 corresponding in position to the side edges of the recording paper 4a moving past the reading section 8. On the other hand, if the leading or trailing edge of the recording paper 4a is irregular or roughened, this fact may be detected by sporadically appearing signals along the lengthwise direction of the reading section 8 as shown in FIG. 9b.

(d) Reading of Marker on Recording Paper

As shown in FIGS. 4a and 4b, a marker indicating the approaching of the end of or the remaining amount of the recording paper 4a may be read by the reading section 8 of the head unit 10. Upon reading of such a marker, an alarm signal may be produced to give a warning to the operator. If the present input/output device is incorporated in a facsimile machine, this alarm signal may be transmitted to another facsimile machine in communication to apprise of the fact that the recording paper 4a is running out.

As described above, in accordance with the above-described structure of the present invention, during the recording mode of operation, the reading section 8 of the head unit 10 can be used to monitor various conditions of the recording paper 4a. That is, the reading section 8 may be used not only for reading an original document during the reading mode of operation, but also for monitoring various conditions of the recording paper 4a during the recording mode of operation.

When the reading section 8 is to be used for monitoring the recording paper 4a during the recording mode of operation, the reading accuracy or required resolution is less strict than the case of reading an original document. That is, to read an original document optically requires the resolution in the order of 8 lines/mm; on the other hand, less accurate resolutions are sufficient for using the reading section 8 for monitoring various conditions of the recording paper 4a under transportation. This is because when reading an original document during the reading mode, an image signal obtained by the reading section 8 is required to faithfully represent the nature of the information contained in the original document. On the other hand, when the reading section 8 is to be used for monitoring of the recording paper 4a during the recording mode, the nature of the information to be detected is very simple and thus high resolution is usually not required. It is to be noted that, in the present invention, an output signal obtained from the reading section 8 is subjected to thresholding operation during either the reading mode or recording mode, so that the output signal is always converted to binary data for further processing.

Under the circumstances, in accordance with one aspect of the present invention, it is so structured that a plurality of light-emitting elements provided in the light-emitting subsection 8a are selectively activated. In the preferred embodiment, during the reading mode, all of the plurality of light-emitting elements are activated; on the other hand, during the recording mode, the light-emitting elements are activated only selectively. For this purpose, an interface should be provided to selectively activate the light-emitting elements depending upon the mode of operation.

Figure 10A:
FIGS. 10 through 26 are schematic illustrations showing various specific examples of the reading section 8a of the structure shown in FIG. 1.
Figure 10B:
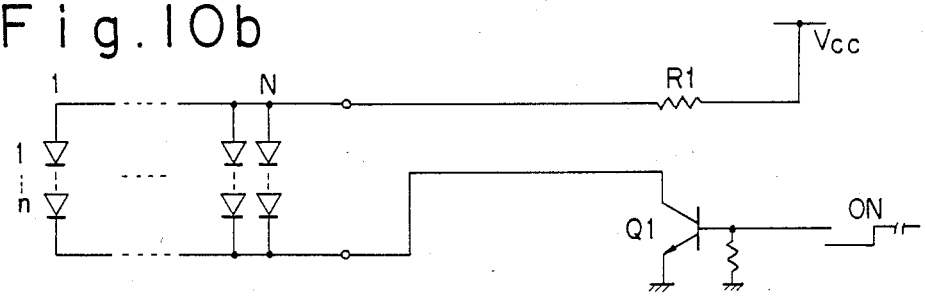

FIGS. 10a and 10b show one example of the light-emitting subsection 8a. As shown in FIG. 10a, the light-emitting subsection 8a is comprised of an N plurality of light-emitting blocks arranged in the form of a linear array. In the present embodiment, as shown in FIG. 10b, each of the light-emitting blocks includes an n plurality of light-emitting diodes connected in series. All of the light-emitting blocks are connected in parallel and each of the light-emitting blocks has its one end connected to a supply voltage $V_{cc}$ through a resistor R1 and its other end connected to the collector of an NPN transistor Q1 which has its emitter connected to ground and its base connected to receive an activation signal. With this structure, when the activation signal is applied to the base of the transistor Q1 to have it turned on, power is applied to all of the light-emitting diodes at the same time.

Figure 11A:
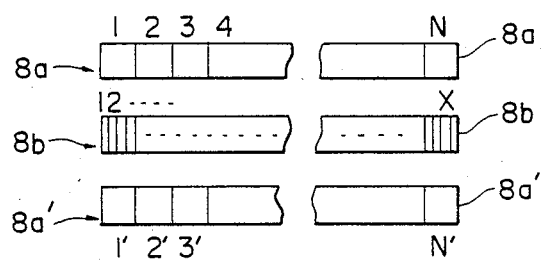
Figure 11B:
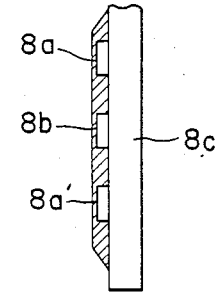

FIGS. 11a and 11b show an example of the reading section 8 which may be advantageously applied to the input/output device shown in FIG. 1. In the illustrated example, the reading section 8 includes a sensor or light-receiving subsection 8b comprised of an X plurality of photodiodes arranged in the form of a linear array and a pair of light source or light-emitting subsections 8a and 8a' each disposed on each side of the sensor subsection 8b in a side-by-side arrangement. As shown in FIG. 11b, these subsections 8a, 8a' and 8b are fixedly mounted on a flat plate 8c constituting part of the head unit 10. In the illustrated embodiment, a filling material is also provided to fill the gaps between the subsections 8a, 8a' and 8b to provide a relatively smooth surface. This is advantageous in the contact type reading unit as in the present embodiment because an object to be read must be brought into sliding contact with the light-receiving subsection 8b.

Figure 12:
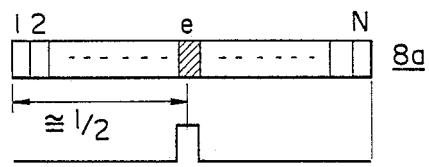
Figure 13:
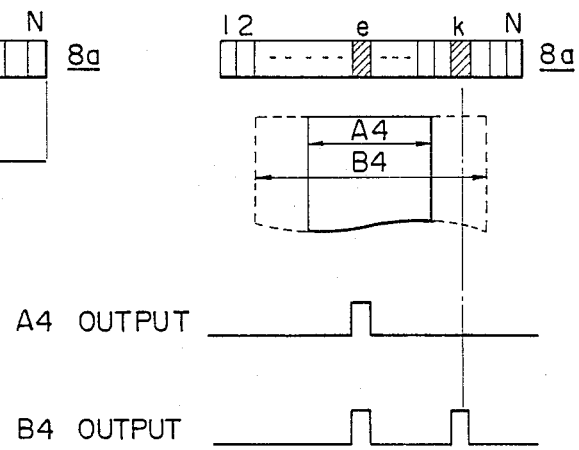

Now, for detecting the presence or absence of the recording paper 4a at a predetermined location, it is only necessary to detect part of the recording paper 4a. Thus, in the case of detecting the presence or absence of the recording paper 4a at the reading section 8 during the recording mode, it is only necessary to activate at least one particular block among those light-emitting blocks which are located between the side edges of the recording paper 4a. FIG. 12 illustrates the case when only the central light-emitting block e is activated for the purpose of detecting the presence or absence of the recording paper 4a at the reading section 8 of the head unit 10.

In the case of detecting the width of the recording paper 4a moving past the reading section 8 during the recording mode, if two different sizes of recording paper, e.g., A4 and B4, are selectively usable, then it is only necessary to activate, for example, the central light-emitting block e and another light-emitting block k which is located outside of A4 size but inside of B4 size. With activation of these two light-emitting blocks e and k, the size of the recording paper 4a under transportation may be determined to be either A4 or B4.

Figure 14A:
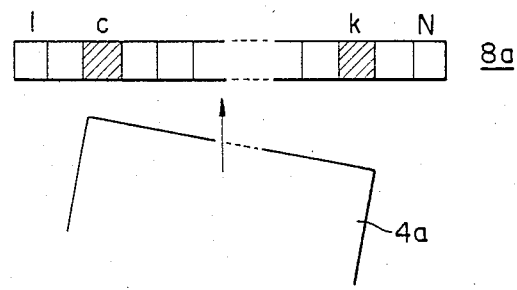
Figure 14B:
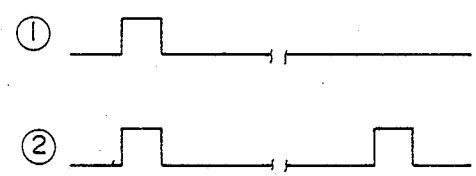

On the other hand, as shown in FIG. 14a, the skew of the recording paper 4a may be detected by activating at least two light-emitting blocks, c and k in the illustrated example, which are located within the width of the recording paper 4a. In the present example, the left edge of the recording paper 4a is first detected by the light-emitting block c, there is produced a signal output from this block at a certain point in time. And, then, the right edge of the recording paper 4a is also detected. Thus, the skew of the recording paper 4a may be detected by observing a temporal difference in the production of an output signal from each of the selected light-emitting blocks c and k. The degree of this temporal difference also indicated the degree of skew.

In addition, in order to detect such a mark as shown in FIG. 4a or 4b, which indicates the remaining amount of the recording paper 4a in the roll 4, it is only necessary to activate those light-emitting blocks which correspond in position to such a mark.

Figure 15:
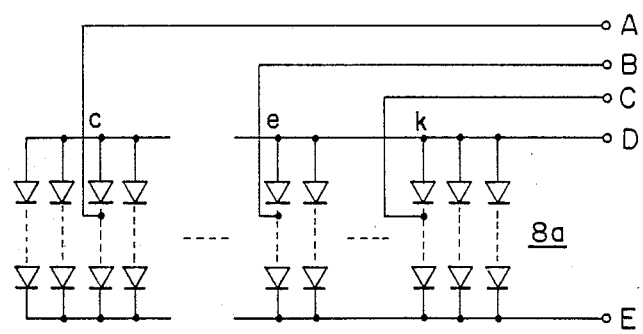
Figure 16:
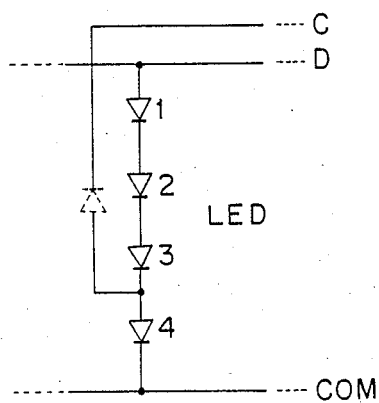

FIG. 15 shows an embodiment of the light-emitting subsection 8a which is so structured that light-emitting blocks c, e and k may be independently selected for activation. That is, these light-emitting blocks are connected to respective terminals A through C which in turn are connected to an interface circuit. Each of the light-emitting blocks has its one end connected to a power supply terminal D and its other end connected to a common terminal E. In one example, during the reading mode of operation, the terminal E is selected so that all of the light-emitting blocks are activated at the same time. On the other hand, during the recording mode of operation, terminal B is selected if desired to detect the presence or absence of the recording paper 4a as shown in FIG. 7a, terminals B and C are selected if desired to detect the size (width) of the recording paper 4a as shown in FIG. 8a, and terminals A and C are selected if desired to detect the skew of the recording paper 4a as shown in FIG. 9a. It is to be noted that in the embodiment shown in FIG. 15, only one light-emitting diode is activated in each of the blocks c, e and k. However, it may also be so structured that two or more light-emitting diodes may be activated for each of these selected blocks, as shown in FIG. 16.

Figure 17:
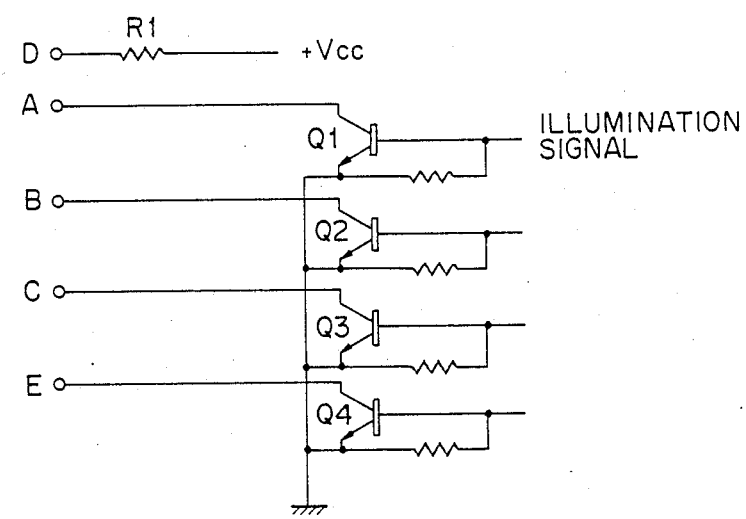

FIG. 17 shows a driver circuit for selecting the terminals A through C and E. As shown, each of the terminals A, B, C and E is connected to the collector of its corresponding NPN transistor Q1, Q2, Q3 or Q3 which has its emitter grounded and its base connected to receive an illumination or selection signal. On the other hand, the power supply terminal D is connected to a power supply voltage $V_{cc}$ through a resistor R1.

In the structures shown in FIGS. 15 and 17, the current flowing through each of the light-emitting diodes is approximately determined by $V_{cc}$ and R1. However, the level of current flowing through each light-emitting diode differs between the reading mode, in which all of the light-emitting diodes are activated, and the recording mode, in which the light-emitting diodes are activated only selectively. In other words, the current level is higher in each of the activated light-emitting diode in the recording mode. However, the resistance value of R1 may be appropriately selected to minimize the effects of such differences in current level.

Figure 18:
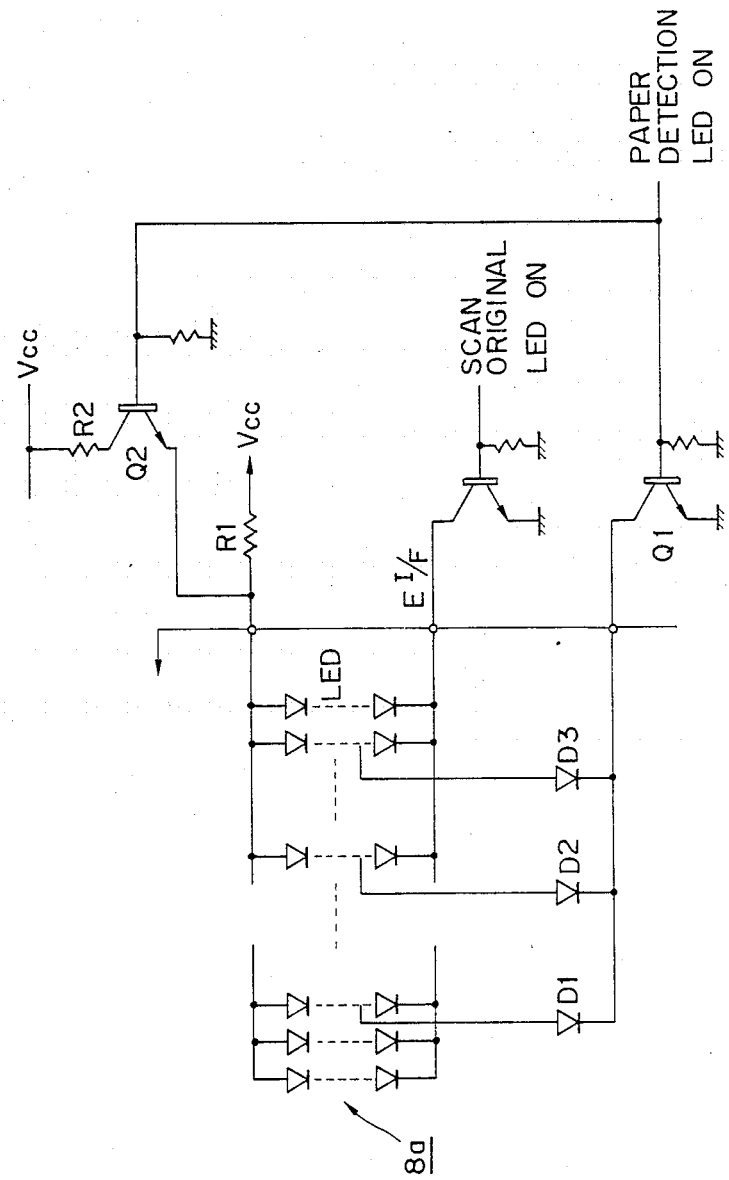

FIG. 18 shows another embodiment in which three light-emitting blocks are selected and a lead line from a selected point of each of these selected blocks is connected to the collector of an NPN transistor Q1 through a corresponding blocking diode D, which blocks a reverse current between the selected blocks because the selected blocks are commonly connected to the collector of the transistor Q1, which has its emitter connected to ground and its base connected to receive a paper detection signal. Each of the light-emitting blocks includes a predetermined number of series connected light-emitting diodes and has its one end connected to a power supply voltage $V_{cc}$ through the resistor R1 and its other end connected to the collector of an NPN transistor which has its emitter connected to ground and its base connected to receive a scan original signal. The terminal, to which the power supply voltage $V_{cc}$ is supplied through the resistor R1, is also connected to the emitter of another NPN transistor Q2 which has it collector connected to the power supply voltage $V_{cc}$ through a resistor R2 and its base connected to receive the paper detection signal. It is to be noted that the scan original signal is supplied when the reading mode is established; whereas, the paper detection signal is supplied when the recording mode is established. With this structure, the level of current flowing each of the activated light-emitting diodes may be set substantially at the same level between the reading and recording modes by appropriately selecting the resistance value of R2.

In an input/output device, in general, increased power is required during the recording mode. Thus, the power requirement is further increased when the reading section 8 is to be activated in addition to the recording section 9 during the recording mode of operation. This would cause an increase in temperature in the head unit 10, which is not advantageous because it is sometime required to provide an additional cooling unit. However, a selective activation approach as described above will mitigate this problem because it helps to minimize the power requirement.

In accordance with another aspect of the present invention, an input/output device having a reading section and a recording section is so structured that a plurality of light sources provided in the reading section are activated all at the same time during the read mode, but only selected ones of the plurality of light sources are activated during the recording mode for monitoring recording paper.

Figure 19:
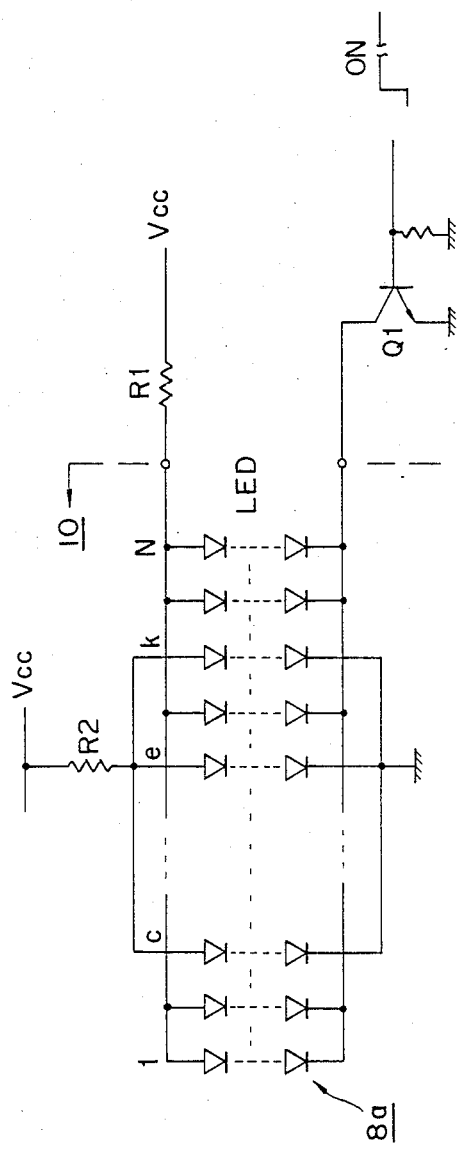

FIG. 19 shows one example of the light-emitting subsection 8a of the reading section 8 constructed according to this aspect of the present invention. As shown, the light-emitting subsection 8a includes a plurality of light-emitting blocks 1 through N arranged in the form of a linear array, each block including a predetermined number of series-connected light-emitting diodes. Each block has its one end connected to a power supply voltage $V_{cc}$ through a resistor R1 and its other end connected to the collector of the NPN transistor Q1 which has its emitter grounded and its base connected to receive an activation signal. In addition, among the N number of blocks, three blocks c, e and k have their one ends commonly connected and also connected to the power supply voltage $V_{cc}$ through a resistor R2 and their other ends commonly connected and also connected to ground. As a result of this structure, upon power up, these three light-emitting blocks c, e and k are maintained activated or lit as long as the power supply voltage $V_{cc}$ continues to be on irrespective of the mode of operation. Thus, these three blocks c, e and k are maintained activated irrespective of whether the recording mode is established or the reading mode is established. When the reading mode is selected, since these three light-emitting blocks c, e and k are always maintained on, all of the remaining light-emitting blocks are activated. Thus, when the reading mode is selected, an activation signal is applied to the base of the transistor Q1 to have it turned on, which in turn causes all of the remaining light-emitting blocks to be turned on.

Figure 20:
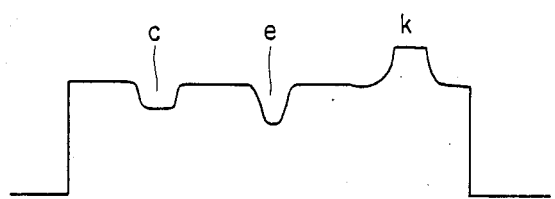

Of importance, the light intensity or amount of light of each of these three light-emitting blocks c, e and k must be substantially equal to that of each of the remaining blocks when the reading mode is established. Otherwise, an output signal from the reading section 8 will present dips and peaks as shown in FIG. 20. In this example, the light intensity is lower for the blocks c and e and higher for the block k as compared with those of the remaining light-emitting blocks. Such irregularities may be completely eliminated by choosing light-emitting diodes uniform in characteristic. However, the irregularities may also be reduced by choosing an appropriate resistance value for each of the resistors R1 and R2.

Figure 21:
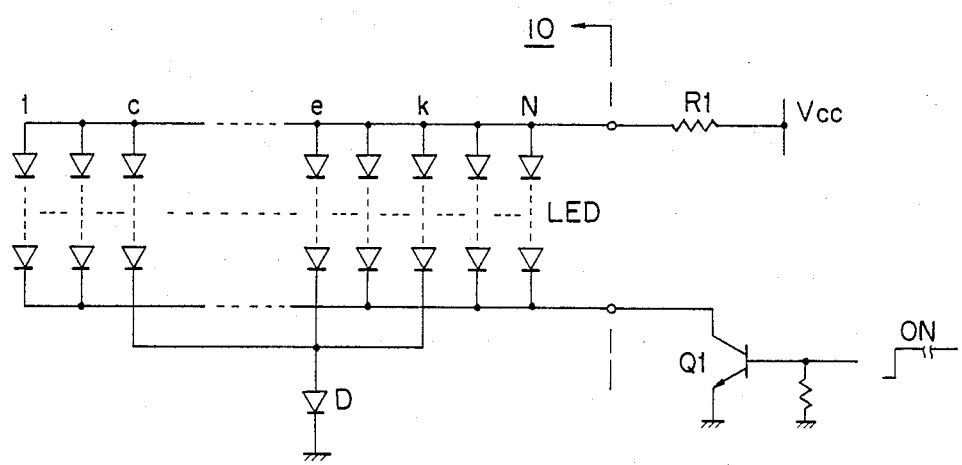
Figure 22:
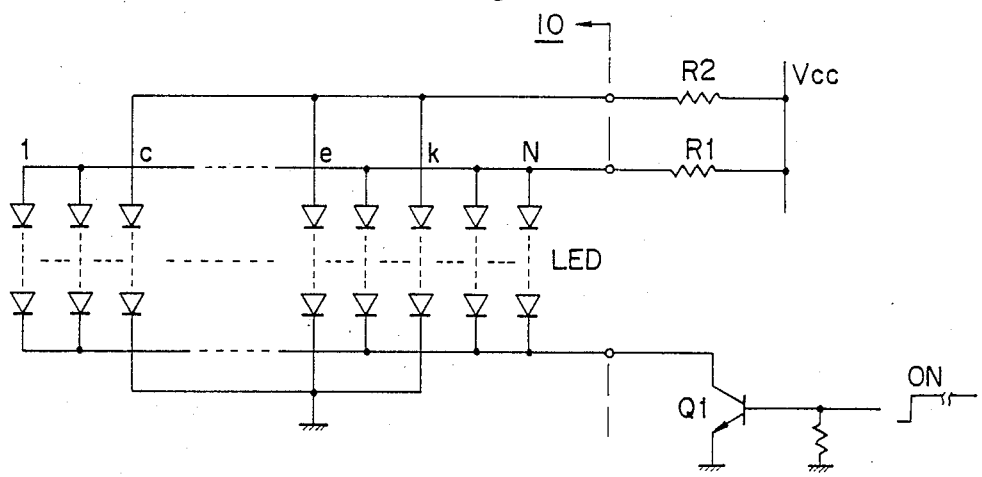

FIGS. 21 and 22 show modifications of the structure shown in FIG. 19. In the case of FIG. 21, a diode D is inserted between the common connection of the three blocks c, e and k and ground so as to compensate for the voltage drop across the collector and the emitter of the transistor Q1. The diode D may be replaced by a transistor. In the case of FIG. 22, the resistor R2 is provided outside of the head unit 10. Other than that, this embodiment is exactly the same as that of FIG. 19.

In accordance with a further aspect of the present invention, there is provided an input/output device having a reading section and a recording section, which is so structured to reduce the power consumption by the light sources provided in the reading section on the average during the recording mode, for example, by reduction of emitted light amount or intermittent activation.

(1) Reduction of emitted light amount

Figure 23:
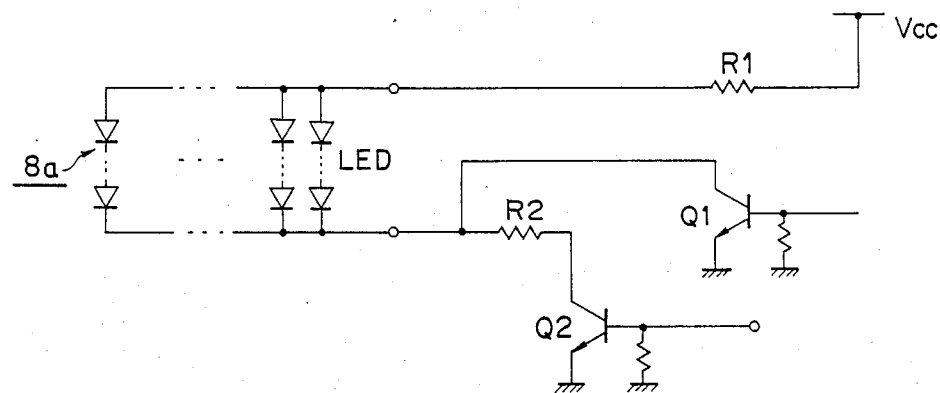

FIG. 23 shows a light-emitting subsection 8a and its associated driving circuit constructed in accordance with one embodiment of the present invention. And, as shown, this structure includes a plurality of light-emitting blocks connected in parallel, each block including a predetermined number of series-connected light-emitting diodes, and the cathode common connection side of the light-emitting subsection 8a is connected to the collector of a transistor Q1, which has its emitter connected to ground and its base connected to receive an activation signal, and also to the collector of a transistor Q2 through a resistor R2. The transistor Q2 has its emitter connected to ground and its base connected to receive an activation signal. On the other hand, the anode common connection side of the light-emitting subsection 8a is connected to the power supply voltage $V_{cc}$. With this structure, when the reading mode is selected, an activation signal is supplied to the base of the transistor Q1 to have it turned on, thereby causing all of the light-emitting diodes to be lit at a higher illumination level. On the other hand, when the recording mode is selected, an activation signal is supplied to the base of the transistor Q2 to have it turned on, thereby causing all of the light-emitting diodes to be lit at a reduced level of illumination. Since high resolution is not required for monitoring recording paper using the reading section during the recording mode, there will be created virtually no disadvantages by lowering the light-emitting amount in this manner.

Figure 24:
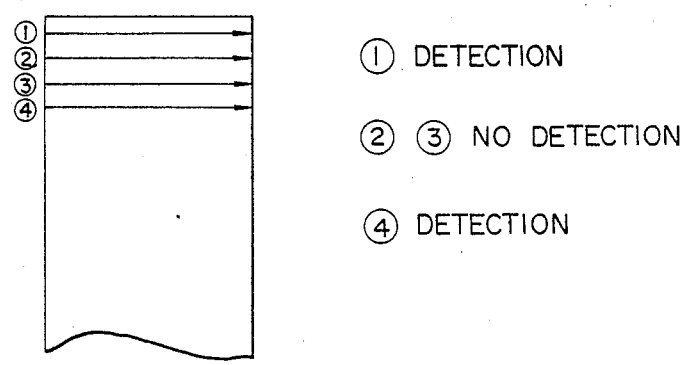
Figure 25:
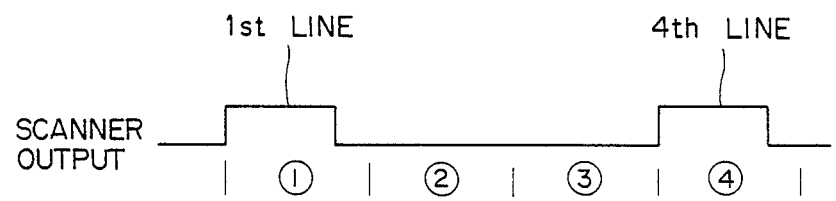

If an intimate contact type image sensor used as part of the reading section 8 of the present input/output device is of the charge accumulating type, then level V of an output signal from such a sensor is proportional to a product of emitted light amount L and time T. Thus, a required power level can be obtained by prolonging the time of collecting light corresponding to the reduced light-emitting amount. In addition, during the recording mode of operation, since high resolution is not required for monitoring recording paper using the reading section 8, it is not necessary to carry out a reading operation for every line. That is, as shown in FIG. 24, when recording paper is travelling upwardly in the direction indicated by the arrow, the reading section could carry out scanning every line at a predetermined pitch as indicated by the circled numbers 1 through 4. However, since the reading operation during the recording mode of operation is not to read fine information, such as image information, but to read rather rough information, such as a marker, skew or width, it is often times more than enough if the reading operation is carried out every two or more lines as indicated in FIG. 24. FIG. 25 shows an output signal from the scanner or light-receiving subsection 8b of the reading section 8, when the reading operation is effected every three lines.

(2) Intermittent Activation

Figure 26:
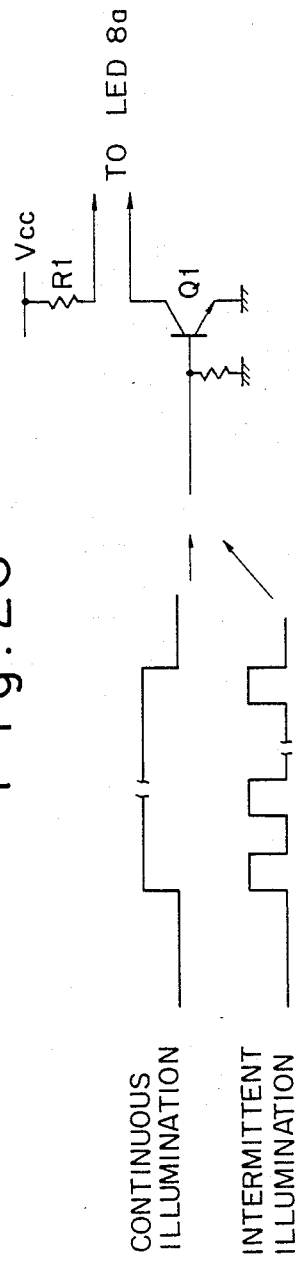

As shown in FIG. 26, in accordance with this embodiment, an activation signal applied to the base of the transistor Q1, which is a driver of connected to each of the plurality of light-emitting blocks, is not a single long duation pulse as in the case of continuous illumination, but a plurality of short duration pulses. That is, during the reading mode, the light-emitting diodes are not continuously lit, but they are lit only intermittently. In this manner, the average amount of power consumption may also be reduced. This concept may be conveniently combined with the concept described with respect to FIGS. 24 and 25. In other words, it may be so structured that the activation pulse is applied in synchronism with every third line In this case, the activation pulse is applied to activate the light-emitting diodes for the first line and no activation pulse is applied for the next two lines. The next activation is applied when scanning the fourth line. In this case, the average amount of power consumption may be reduce to $\frac{1}{3}$ of that of the continuous illumination case.

Figure 27:
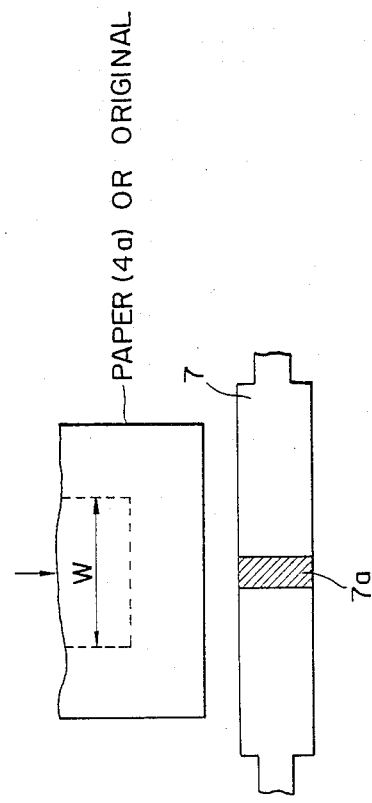
FIGS. 27 through 29 are schematic illustrations which are useful for explaining an embodiment in which a portion having a different reflecting index is provided in the common feed roller 7 in the structure shown in FIG. 1.

As described previously, the common feed roller 7 is preferable to have a peripheral surface having a white or similar color. And, typically, recording paper has a white or similar color prior to use, so that there may be a case in which difficulty is encountered in discriminating recording paper from the common feed roller 7. FIG. 27 shows an embodiment which may be advantageously used to cope with such a situation. That is, in the embodiment shown in FIG. 27, the common feed roller 7 is provided with a ring portion 7a having a reflective index different from that of the remaining peripheral surface, which is white in color, of the common feed roller 7. In the illustrated embodiment, the ring portion 7a has a predetermined width and is provided approximately at the middle all around its circumference. Preferably, the reflective index of the ring portion 7a is selected to be lower than that of the remaining peripheral surface of the common feed roller 7, so that a color, such as grey, black, red, or blue, may be preferably selected for the ring portion 7a, with grey being most preferred.

In general, in an input/output device, the conditions of an original document, such as width, which can be handled by such an input/output device is previously defined. Thus, the ring portion 7a should be set at an appropriate location of the common feed roller 7 so as not to cause any inconveniences in light of such previously defined conditions. In the structure of the input/utput device shown in FIG. 1, an original document to be read is placed on the table 1 and the original document is fed into the device from there. However, although not shown specifically, the position of placing an original document on the table 1 is predefined and usually indicated by original placement guides on the top surface of the table 1. Therefore, the location of the ring portion 7a on the common feed roller 7 may be suitably determined in light of the location of such placement guides. In addition, if a minimum width of an original document which can be handled by such an input-output device, as indicated by W in FIG. 27, then the ring portion 7a should be located such that it will be covered by such a minimum-sized original document when fed.

Figure 28:
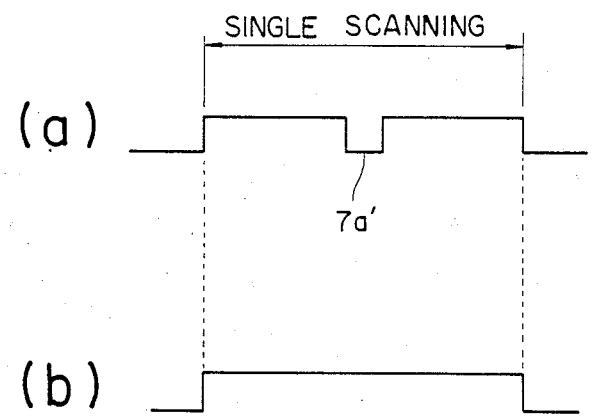

On the other hand, when the input/output device shown in FIG. 1 is set in the recording mode of operation, upon reception of a recording signal, the supply and common feed rollers 5 and 7 are set in rotation, so that the leading edge of the recording paper 4a so far located between the supply and common feed rollers 5 and 7 move toward and finally pass the common feed roller 7. In this event, until the leading edge of the recording paper 4a has reached the common feed roller 7, an output signal as indicated in FIG. 28 (a) is obtained from the reading section 8. In this signal, a dip 7a' corresponds to the ring portion 7a of the common feed roller 7. After the leading edge of the recording paper 4a has reached the common feed roller 7 to be inserted between the common feed roller 7 and the reading section 8, an output signal as shown in FIG. 28 (b) is obtained from the reading section 8. Thus, this fact may be utilized to detect the occurrence of jamming. That is, it may be assumed that malfunctioning in transportation, such as jamming, has occurred if the output signal shown in FIG. 28 (b) has not been obtained after elapsing a predetermined time period. On the other hand, if the recording paper 4a has all been consumed, the output signal shown in FIG. 28 (a) reappears, so that the output signal shown in FIG. 28 (b) may be monitored to assume the fact that there still is some recording paper left to be used.

In the input/output device shown in FIG. 1, it is so structured that the recording paper 4a is moved back until its leading edge comes to be located at a predetermined initial position between the supply and common feed rollers 5 and 7 after cutting a recorded portion of the recording paper 4a. Thus, after elapsing some time upon cutting of the recording paper, the output signal shown in FIG. 28 (a) reappears. Accordingly, it may be so structured to assume that improper cutting has occurred if the output signal shown in FIG. 28 (a) has not reappeared after elapsing a predetermined time period subsequent to a cutting operation.

Figure 29:
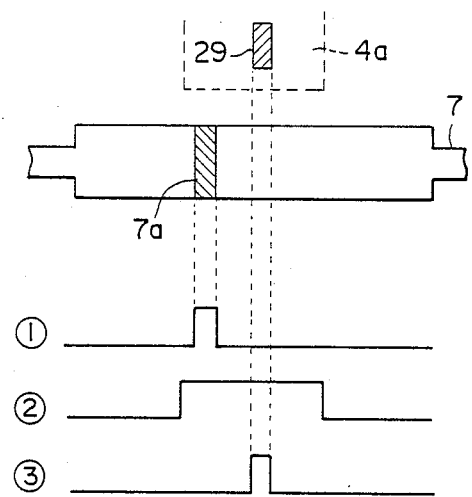

It is often the case that a near end mark is provided in the vicinity of the trailing edge of the recording paper 4a when supplied in the form of roll 4. Such a near end mark is typically indicated in grey or black, though it can be indicated in any other color, such as red and blue. In some input/output devices, this near end mark is detected to issue a warning to the operator. In such a case, if the ring portion 7a of the common feed roller 7 corresponds in position to such a near end mark, there is a chance that the near end mark cannot be properly detected. In order to avoid such a disadvantage, the ring portion 7a should be located such that it does not correspond in position to such a near end mark, as shown in FIG. 29. That is, in this case, until the leading edge of the recording paper 4a has reached the common feed roller 7, an output signal shown by 1 with a circle in FIG. 29 is obtained by the scanning action of the reading section 8. And, an output signal shown by 2 with a circle is obtained from the reading section 8 during recording. And, when a near end mark 29 has appeared, an output signal shown by 3 with a circle is obtained from the reading section 8. Thus, the fact that the recording paper 4a is running out can be properly detected. It should be noted that, although not shown specifically, such an operation may be easily carried out by programming a microprocessor provided in a control system of the input/output device or in a host system.

Figure 30:
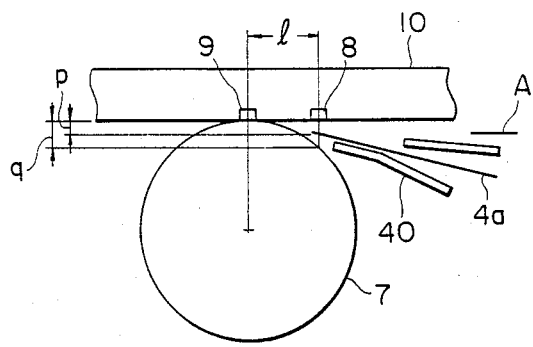
FIG. 30 is a schematic illustration which is useful for understanding the reading operation by the reading section 8 of the structure shown in FIG. 1.

As described previously, the peripheral surface of the common feed roller 7 in the present input/output device is preferably set to be white in color. Although this is advantageous during the reading mode of operation, it might cause a problem of using the reading section 8 for monitoring recording paper 4a during the recording mode of operation because the recording paper 4a is normally white in color before recording. FIG. 30 shows another embodiment which allows to monitor the recording paper 4a properly using the reading section 8 even if the peripheral surface of the common feed roller 7 is white in color. Since FIG. 30 shows the state when the present input/output device is set in the recording mode of operation, the common feed roller 7 is in direct contact with the recording section 9 of the head unit 10. Under this condition, a vertical distance from the reading section 8 to the peripheral surface of the common feed roller 7 is indicated by q. Another distance q is indicated in FIG. 30 and this is a maximum distance at which the reading section 8 can optically read information from an object properly, and, thus, it corresponds to the field of depth of the reading section 8.

The maximum allowable distance p is set to be smaller than the vertical distance q between the reading section 8 and the common feed roller 7. A guide plate 40 is provided to insure that the recording paper 4a moves within the maximum allowable distance p. Therefore, if there is no recording paper 4a, there is nothing to be detected within the detectable range, so that the reading section 8 will provide a "black" signal, indicating the absence of the recording paper 4a. On the other hand, when the recording paper 4a is properly supplied by the supply roller 5, then the recording paper 4a is destined to move past the detectable range within the field of depth p, the reading section 8 will output a "white" signal indicating the presence of the recording paper 4a. In addition, since the recording paper 4a moves within the field of depth p range, any information such as a mark shown in FIGS. 4a or 4b can be properly read by the reading section 8. This aspect of the present invention is also preferably implemented by way of software in a microprocessor provided in the control system of the present input/output device or its associated host system.

Figure 31A:
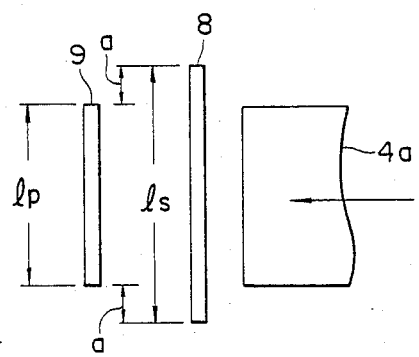
FIGS. 31 through 36 are schematic illustrations which are useful for understanding the importance between the relative length relationship between the reading and recording sections 8 and 9 in the structure shown in FIG. 1.

In accordance with a further aspect of the present invention, in the present input/output device having the reading section 8 upstream of the recording section 9, the reading section 8 is preferably set longer than the recording section 9, as shown in FIG. 31a. In the illustrated embodiment, the recording section 9 has a length of an active area corresponding to the width of A4-sized recording paper 4a and the reading section 8 has a length of an active area corresponding to the width of B4-sized recording paper 4a. Thus, in this case, an object up to B4 size can be read by the reading section 8 and recording can be carried out up to A4 size. It is assumed that the reading and recording sections 8 and 9 are arranged such that a line connecting their centers is in parallel with the direction of transportation of the recording paper 4a. Assuming the line density in the optical scanning direction to be 8 dots/mm for each of the reading and recording sections 8 and 9, the total number of dots for each of the reading and recording sections 8 and 9 can be calculated as follows:

$l_P = A4 = 216$ mm $= 1,728$ dots, and
$l_S = B4 = 256$ mm $= 2,048$ dots.

Figure 31B:
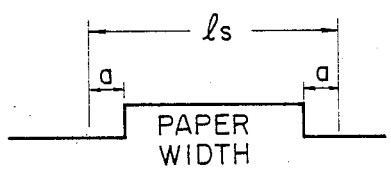

As shown in FIG. 31a, when the recording paper 4a of A4 size is set in position and recording operation is initiated, the recording paper 4a moves from the position indicated by the solid line past the reading section 8 and reaches the recording section 9 where recording is effected on the recording paper 4a. As described before, in the present input/output device, during this recording mode of operation, the reading section 8 can be used to monitor the status of the recording paper 4a. Under this condition, if the recording paper 4a is properly positioned when moving past the reading section 8, it will move past the reading section 8 corresponding in position to the central portion of the reading section 8 defined by removing a portion a from both ends. In this case, there will be obtained an output signal as shown in FIG. 31b from the reading section 8. Of course, there should be provided some tolerance for the distance a. And, as long as the recording paper 4a moves past the reading section 8 within an expected range thereof as described above, it can be determined that the recording paper 4a under transportation is proper.

Figure 32A:
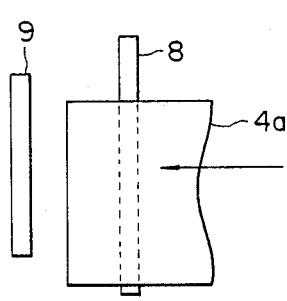
Figure 32B:
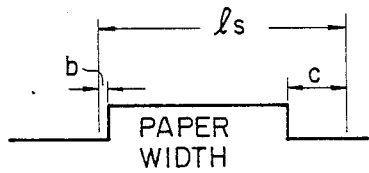
Figure 33:
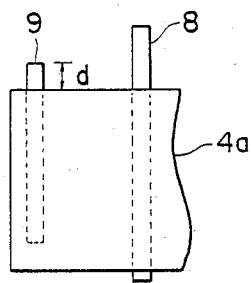

On the other hand, if the recording paper 4a under transportation is shifted in position sideways as shown in FIG. 32a, there will be obtained an output signal from the reading section 8 as shown in FIG. 32b. In this event, since the left margin b is much smaller than the right margin c, it can be determined that the recording paper 4a is shifted in position to the left and also that the recording paper 4a will not be properly aligned with the recording section 9. In other words, when the recording paper 4a further advances under this condition, the recording paper 4a will be misaligned with the recording section 9 as shown in FIG. 33, in which case information output from the mismatched portion d will be lost and will not be recorded on the recording paper 4a. Accordingly, when the condition shown in FIG. 32a is detected, this fact can be used to temporarily halt the further processing and also to give a warning to the operator.

Figure 34:
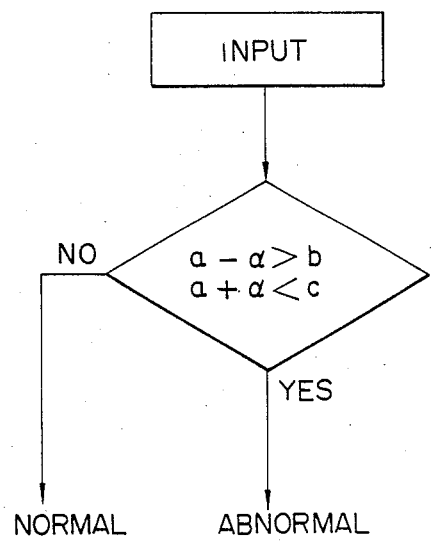

Similarly with the previous embodiments, the information obtained from the reading section 8 in the present embodiment is preferably sent to a microprocessor which contains a program to determine the status of the recording paper 4a under transportation. FIG. 34 illustrates a flow chart which may be programmed in such a microprocessor. In the flow chart of FIG. 34, a, b and c correspond to those indicated in FIGS. 31b and 32b and alpha indicates a selected tolerance.

In the above-described embodiment, the reading section 8 is set for B4 size and the recording section 9 is set for A4 size, in which case the reading section 8 is necessarily longer than the recording section 9. It is to be noted, however, that both of the reading and recording sections 8 and 9 may be set for the same size, such as A4 size. In this case, however, an additional segment must be added to each end of the reading section 8 so as to make the combined reading section 8 longer than the recording section 9. The additional reading segment, however, may be coarser in line density because it is only used for monitoring of the recording paper 4a and not of optical reading of an original document.

Figure 35:
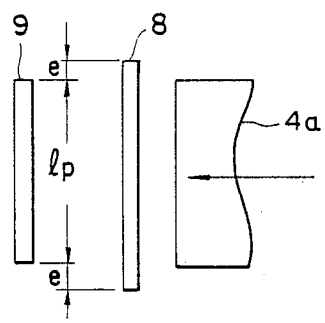

FIG. 35 shows an embodiment in which the recording section 9 has a length $l_P$ which is equal to 216 mm and has 1,728 dots assuming the line density to be 8 dots/mm. The reading section 8 is disposed upstream of the recording section 9 with respect to the direction of transportation of the recording paper 4a as indicated by the arrow and has a length equal to $l_P + 2e$, where that portion of the reading section 8 which corresponds to e at each end thereof is an added segment for use in monitoring the transportation condition of the recording paper 4a. That portion of the reading section 8 which corresponds to $l_P$ of the recording section 9 may be set to have the same line density as that of the recording section 9. Since the additional segment e is used only for monitoring the recording paper 4a, its line density may be set lower, such as 4 dots/mm or 2 dots/mm. If this portion e is set to have the line density of 2 dots/mm and to have 8 dots, then it will be 4 mm long. Therefore, the effective length of the reading section 8 becomes $l_P + (4 \times 2)$ mm and the total number of dots will be 8 dots $+ 1,728$ dots $+ 8$ dots $= 1,744$ dots. When this reading section 8 having the additional segments each at each end is used to carry out optical reading of an original document during the reading mode, there will be obtained an output signal from each of the 1,744 dots. And, thus, the output signals from the eight dots on both ends should be discarded before processing.

Figure 36:
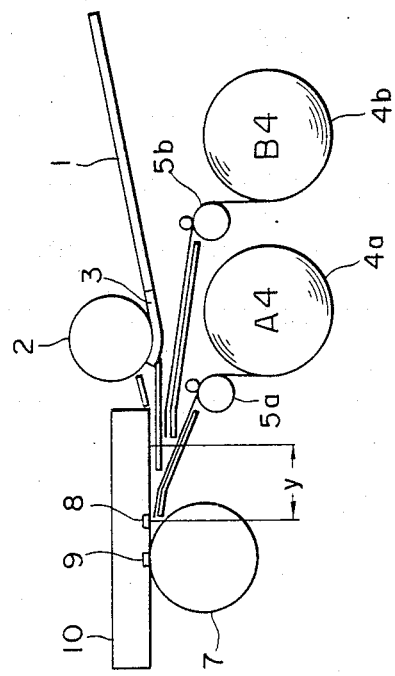

FIG. 36 shows another embodiment of the present input/output device, in which a pair of rolls 4A and 4B of recording paper is provided. In this structure, it is assumed that the reading section 8 is capable of reading up to A3 size document and the recording section 9 is capable of recording up to B4 size and that the roll 4A stores recording paper of A4 size and the roll 4B stores recording paper of B4 size. It is also assumed that the device shown in FIG. 36 has the recording mode as a normal or stand-by mode so that the recording paper of the size which has been used in the immediate last recording operation is set ready in a reading station for detecting its width. In the situation shown in FIG. 36, the recording paper of A4 size unwound from the roll 4A is set in this status Under the condition, when the reading mode is selected, the supply roller 5a is driven to rotate in the reversed direction to pull the recording paper backward over a distance indicated by y. And, the common feed roller 7 is moved relative to the head unit 10 so that the common feed roller 7 comes into direct contact with the reading section 8. Then, original documents placed on the table 1 are fed one by one by the separator roller 2 and read one by one by the reading section 8. Upon completion of this reading operation, the common feed roller 7 is moved back to be in contact with the recording section 9 of the head unit 10, and, then, the supply roller 5a is driven to rotate in the forward direction to move the recording paper over the distance y as unwound from the roll 4A, thereby establishing the recording mode as a stand-by mode On the other hand, under the condition shown in FIG. 36, if the recording mode for recording information on the recording paper of A4 size is selected, the recording paper set in the condition shown in FIG. 36 is caused to move past the recording section 9, whereby recording is effected Upon completion of recording, the recording paper is returned to the initial state as shown in FIG. 36.

Alternatively, under the condition shown in FIG. 36, if the recording mode for recording information on the recording paper of B4 size is selected, after detecting the width of the paper currently set in the stand-by condition shown in FIG. 36 to be A4 size, the supply roller 5a is driven to rotate in the reversed direction to have the recording paper of A4 size moved back over the distance DbK. Then, the supply roller 5b is driven to rotate in the forward direction to feed the recording paper of B4 size as unwound from the roll 4B. As the recording paper of B4 size is being supplied, recording is effected thereon. Upon completion of recording, the recording paper of B4 size is moved back until the leading edge reaches the reading section 8.

In this manner, the reading section 8, which is used for optically reading an original document, can be used to detect the size or width of recording paper and thus there is no need to provide a separate detector for detecting the size or width of recording paper. It is to be noted that in the above-described embodiment, either of the two rolls of recording paper, which has been used in the immediate last recording operation, is set in a stand-by mode. However, it may also be so structured that either of the two rolls of recording paper, which is more often used, is always set in a stand-by mode.

Figure 37:
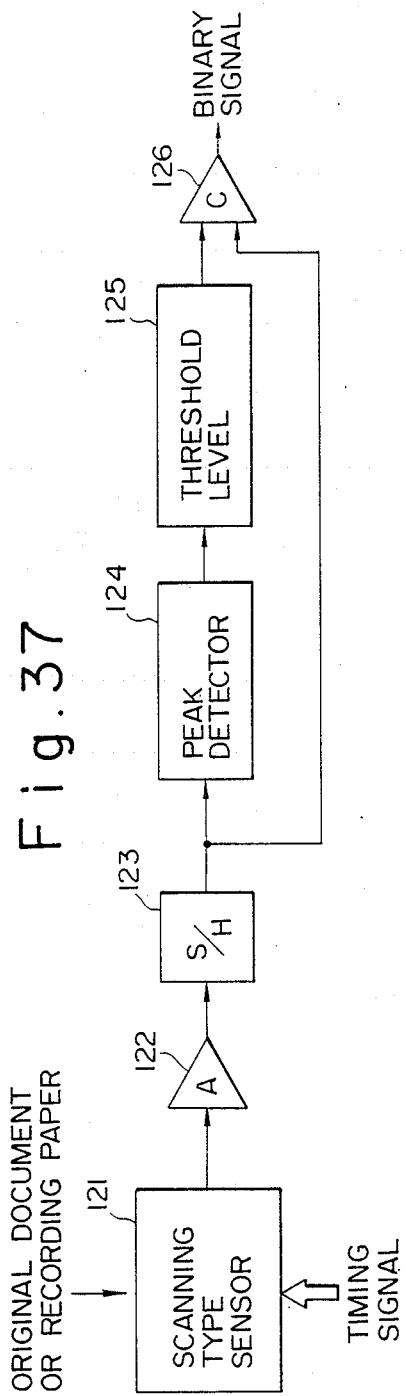
FIGS. 37 through 41 are schematic illustrations which are useful for understanding a control system for use in the structure shown in FIG. 1.
Figure 38:
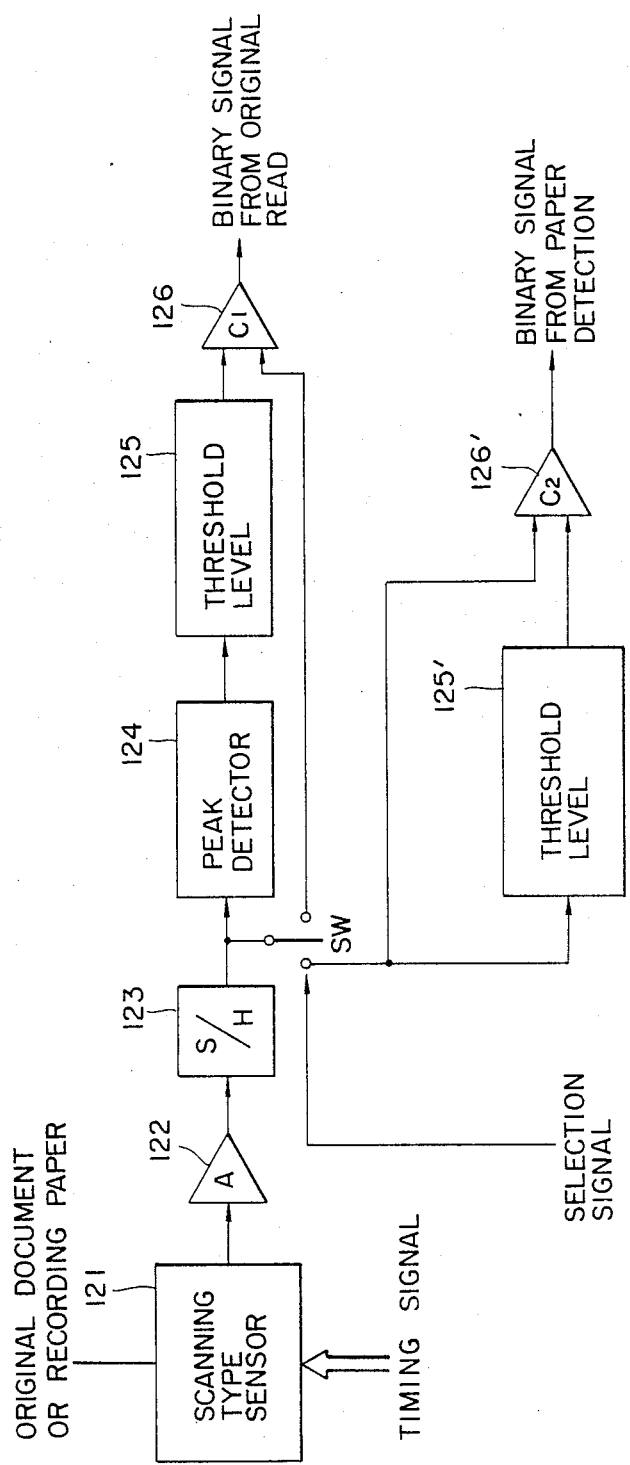

Now, a still further aspect of the present invention will be described with reference to FIGS. 37 through 41. As described previously, when reading is effected using the reading section 8 of the present input/output device, an output signal in the analog format is supplied from the reading section 8. This analog output signal must be converted into a binary signal for further processing. FIG. 37 shows in block form a system for converting an analog output signal supplied from the reading section 8 into a binary signal for use in further processing. As shown in FIG. 37, the system includes a scanning type sensor 121 which corresponds to the light-receiving subsection 8b in the previous embodiments, an amplifier 122, a sample and hold circuit 123, a peak detector 124, a threshold level determining circuit 125 and a comparator 126. FIG. 38 shows a modification in which an additional thresholding determining circuit 125' and a comparator 126' are provided as branched out at a selection switch SW for processing the output signal obtained during the reading mode and the output signal obtained during the recording mode separately.

As described previously, the reading section 8 in the present input/output device is used not only for reading an original document in the reading mode of operation, but also for monitoring recording paper in the recording mode of operation. When the reading section 8 is used to effect reading during the recording mode, recording paper is read by the reading section 8 and this is equivalent to reading a blank original document in the reading mode. In addition, since the resolution of the reading section 8 used for optically reading an original document during the reading mode of operation is more than sufficient for the reading operation during the recording mode of operation, the system shown in FIG. 37 can be advantageously used for processing output signals obtained by the reading section 8 during both of the reading and recording modes, though the system shown in FIG. 37 is primarily designed to carry out a reading operation during the reading mode.

Figure 39:
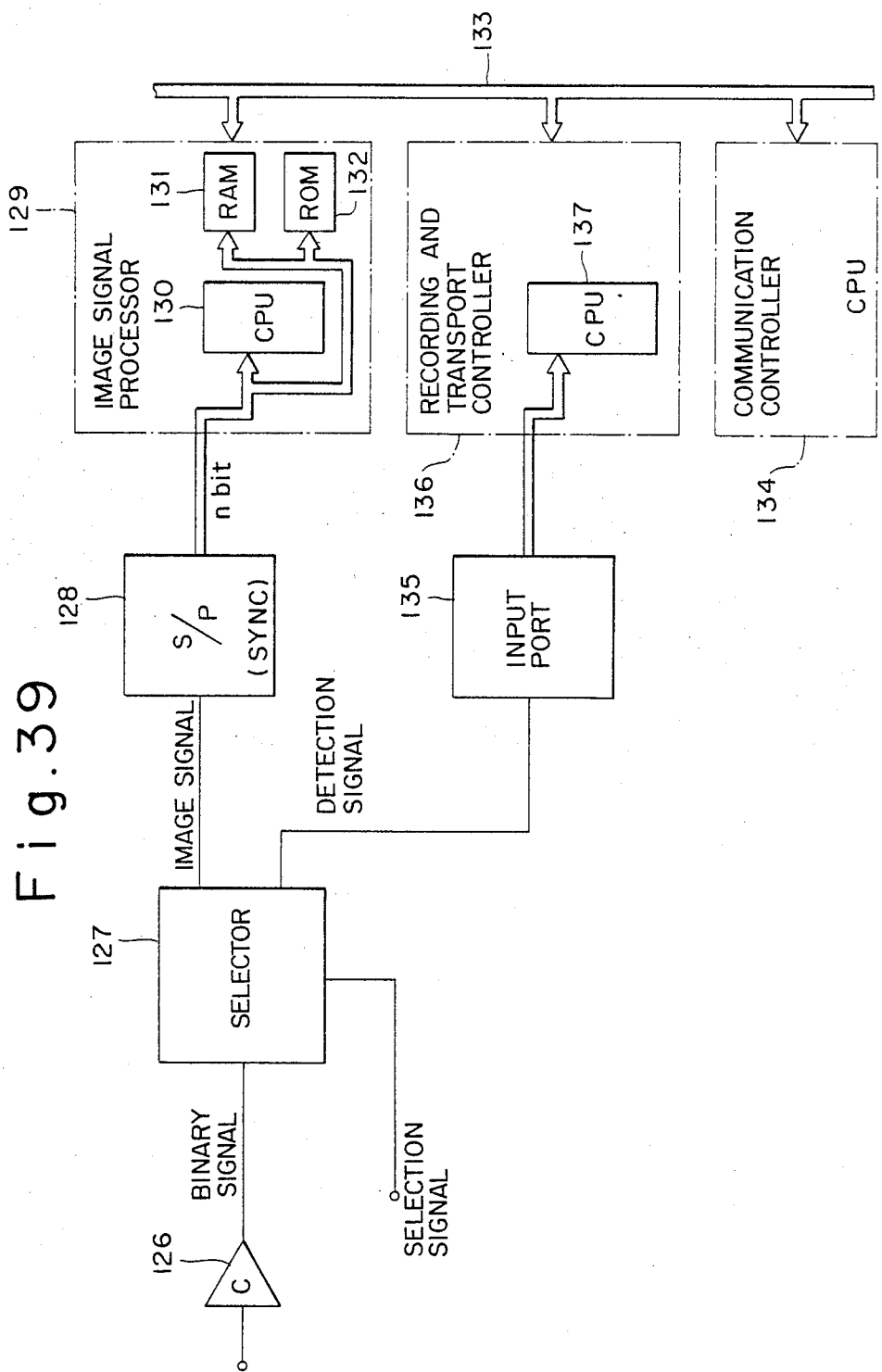

In the case when the system shown in FIG. 37 is used for processing output signals from the reading section 8 both in the reading and recording modes, it is necessary to identify whether a binary output supplied as an output of the comparator corresponds to an image signal obtained by reading an original document during the reading mode or to a detection signal obtained by reading recording paper during the recording mode. For this purpose, as shown in FIG. 39, the comparator 126 of the binary converting system shown in FIG. 37 is connected to a selector 127 which has another input terminal for receiving a selection signal, indicating whether the current output from the comparator 126 is an image signal (reading mode) or a detection signal (recording mode). Thus, the condition of the selection signal is determined depending on the current mode of operation of the present input/output device.

In the case where the present input/output device is in the reading mode and thus an output from the comparator 126 is an image signal, then the output from the comparator 126 is supplied to a serial/parallel conversion circuit 128, where the serial image signal is converted into an n-bit parallel signal. This parallel signal is previously determined to have a format which is convenient for processing by a central processing unit 130 provided within an image singal processor 129. For example, if the CPU 130 is of the 8-bit type, then it is set such that n=8. If the image signal has 1,728 bits, then the signal is supplied into the CPU 130 8 bits by 8 bits over 216 times. In association with a clock signal, the image signal is coverted into parallel data at the serial/parallel converter 128 and stored into a random access memory 131. In addition or alternatively, the thus converted parallel data may be transferred to another unit, such as a communication controller 134, through a bus 133. Thus, no detection signal (obtained by the reading section 8 during the recording mode) is supplied to the image signal processor 129.

On the other hand, in the case when the present input/output device is operating in the recording mode and thus an output signal supplied from the comparator 126 is a detection signal, the output signal is routed to an input port 135 by the selector 127. The input port 135 may have a latching function to latch data, if desired, and the input port 135 is connected to a central processing unit 137 provided in a recording and transport controller 136 and also to the data bus 133. The input port 135 may be connected to an interrupt terminal of the CPU 137. Since the CPU 137 is dedicated to the control of recording and paper transporting conditions, the detection signal supplied to the CPU 137 through the input port 135 is treated as data for use in monitoring recording paper during the recording mode of operation. Thus, previously described various monitoring functions, such as detection of presence or absence of recording paper, or detection of skew or width of recording paper, may be stored in the form a program in the CPU 137.

Figure 40:
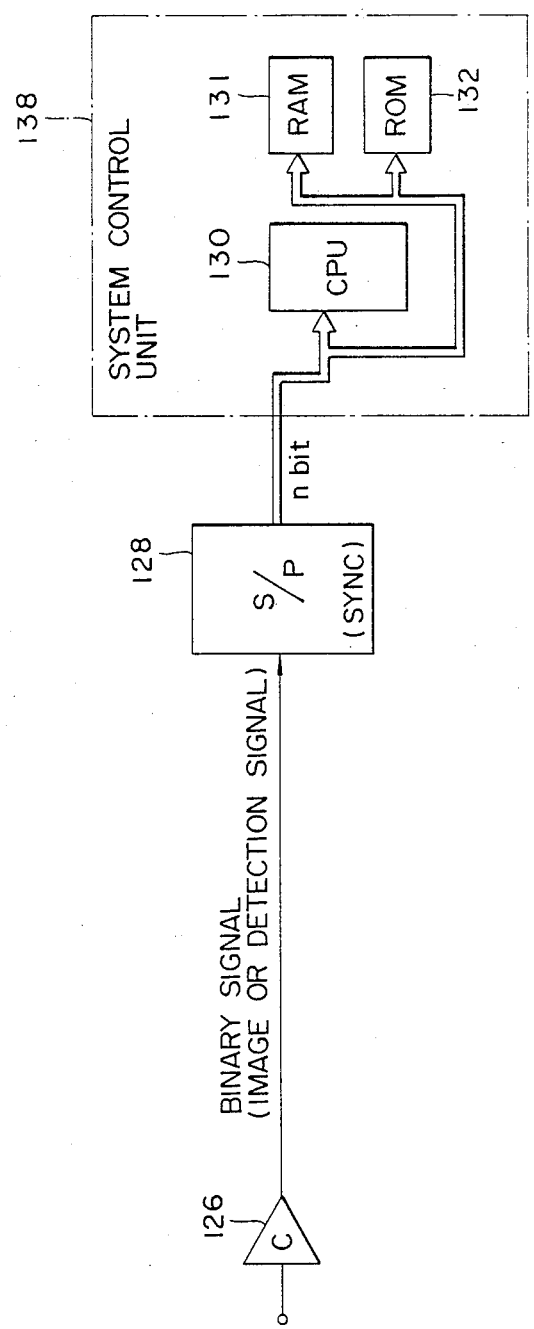
Figure 41:
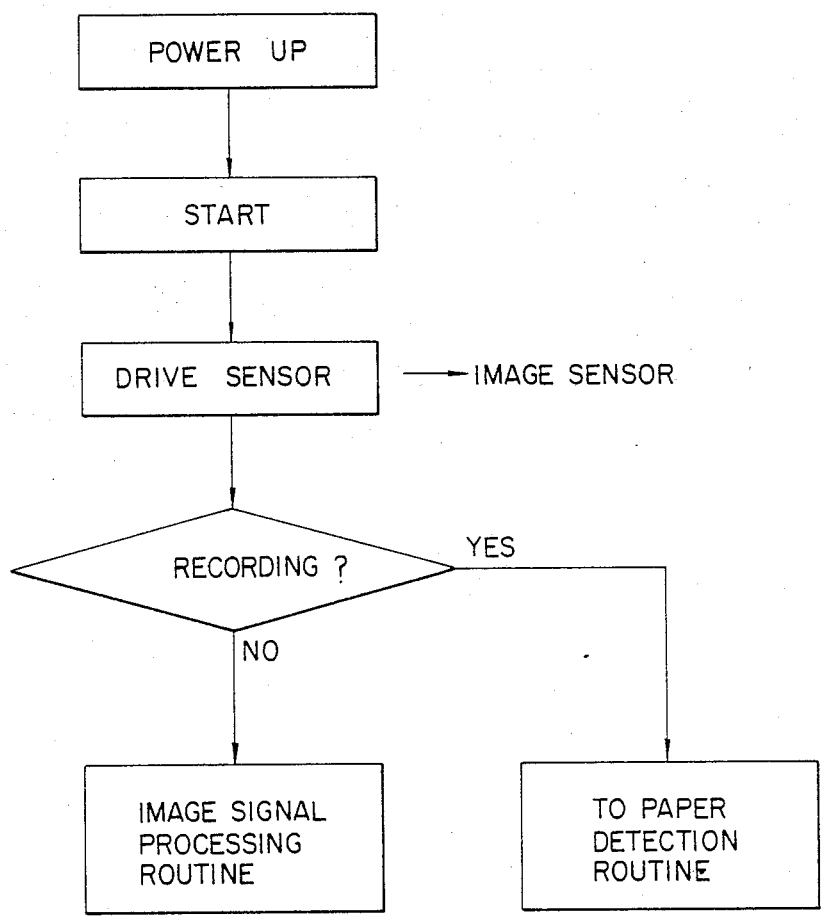

Alternatively, there is a case in which the same CPU is used for processing both image and detection signals so as to make the overall system compact in size and few in the number of components. This is the case in which the image signal processor 129 and the recording and transport controller 136 are combined into one unit having a common CPU. It is, of course, true that the communication controller 134 may also be integrated into this combination, if desired. Such an alternative structure is shown in FIG. 40, in which a binary output signal supplied from the comparator 126 is converted into parallel data by the serial/parallel converter 128 and fed into the CPU 130 irrespective of the fact that the binary signal is an image signal or a detection signal. In this case, however, a software program shown in the form of flow chart in FIG. 41 is stored in the CPU 130 so that the binary signal supplied to the CPU 130 is properly sorted out between image and detection signals prior to further processing. A selection signal, indicating whether the present input/output device is currently in either the reading mode or the recording mode, can be easily supplied to the CPU 130.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A reading/recording device comprising:
   a common path defined in said device for transporting an original document when said device is set in a reading mode or a recording medium when said device is set in a recording mode, selectively;
   transporting means for transporting said original document or recording medium through said common path;
   reading means disposed in said common path for optically reading said original document during said reading mode and also for detecting a condition of said recording medium being transported during said recording mode; and
   recording means disposed downstream of said reading means for recording said recording medium.

2. The device of claim 1 further comprising supporting means for supporting said reading means and said recording means as a unit.

3. The device of claim 2 wherein said supporting means has a bottom surface in which said reading means and said recording means are provided as fixed in position.

4. The device of claim 3 wherein said bottom surface is substantially flat and defines part of said common path.

5. The device of claim 2 wherein said supporting means further supports thereon a first driver circuit for driving said reading means and a second driver circuit for driving said recording means.

6. The device of claim 1 further comprising positioning means for positioning said transporting means and said reading means in contact during said reading mode and said transporting means and said recording means in contact during said recording mode.

7. The device of claim 6 further comprising means for biasing said transporting means against either of said reading means and recording means depending on whether a current mode is said reading mode or said recording mode.

8. The device of claim 1 wherein said reading means includes light-emitting means for emitting light into said common path and light-receiving means for receiving light reflected by either of said original document or recording medium under transportation through said common path depending on whether the current mode is said reading mode or recording mode.

9. The device of claim 8 wherein said light-emitting means includes a plurality of light-emitting blocks arranged in the form of an array extending across said common path in a widthwise direction.

10. The device of claim 9 wherein each of said light-emitting blocks includes at least one light-emitting element.

11. The device of claim 8 wherein said light-receiving means includes a plurality of light-receiving elements arranged in the form of an array in parallel with said array of light-emitting blocks.

12. The device of claim 11 wherein each of said light-receiving elements includes a photoelectric element capable of converting received light into an electrical signal.

13. A reading/recording device comprising:
   a common path defined in said device for transporting an original document when said device is set in a reading mode or a recording medium when said device is set in a recording mode, selectively;
   transporting means for transporting said original document or recording medium through said common path;
   reading means disposed in said common path for optically reading said original document during said reading mode and also for detecting a condition of said recording mode, said reading means including a plurality of light-emitting units arranged in the form of a first array in a widthwise direction of said common path and a plurality of light-receiving units arranged in the form of a second array in parallel with said first array;
   controlling means for controlling an operation of said plurality of light-emitting units; and
   recording means disposed downstream of said reading means for recording said recording medium.

14. The device of claim 13 wherein said controlling means controls such that at least selected one of said plurality of light-emitting units is maintained activated at all times upon power up of said device.

15. The device of claim 13 wherein said controlling means controls such that said plurality of light-emitting units are selectively activated in a predetermined sequence during said recording mode.

16. The device of claim 13 wherein said controlling means controls such that said plurality of light-emitting units are intermittently activated at a predetermined frequency during said recording mode.

17. The device of calim 13 wherein said controlling means controls such that said plurality of light-emitting units emit light of reduced amount during said recording mode as compared with a light amount emitted during said reading mode.

18. A reading/recording device comprising:
a common path defined in said device for transporting an original document when said device is set in a reading mode or a recording medium when said device is set in a recording mode, selectively;
a head unit having a surface disposed in said common path, said surface defining part of said common path;
a reading section fixedly mounted on said surface of said heads unit for optically reading said original document during said reading mode and also for detecting a condition of said recording medium being transporting during said recording;
a recording section fixedly mounted on said surface of said head unit downstream of said reading section with respect to a forward transporting direction of said common path;
a roller for transporting either of said original document or said recording medium through said common path;
means for positioning said roller to be pressed against said reading section when said device is set in said reading mode or against said recording section when said device is set in said recording mode; and
driving means for driving to rotate said roller in a desired direction.

19. The device of claim 18 wherein said roller has a peripheral surface having a first reflective index excepting a predetermined portion to be read by said reading means, which has a second reflective index different from said first reflective index.

20. The device of claim 19 wherein said first reflective index is substantially equal to that when said peripheral surface excepting the predetermined portion is a white surface.

21. The device of claim 20 wherein said predetermined portion is in the form of a ring having a predetermined width and extending around said roller along said peripheral surface.

22. The device of claim 18 wherein said reading section has a field of depth which is set such that nothing but said recording medium can pass within said field of depth during said recording mode.

23. The device of claim 22 further comprising guiding means for guiding said recording medium to pass within said field of depth during said recording mode.

24. The device of claim 18 wherein said reading section has a first effective length extending in a widthwise direction of said common path and said recording section has a second effective length extending in said widthwise direction, whereby said first effective length is longer than said second effective length.

25. A reading/recording device comprising:
a common path defined in said device for transporting an original document when said device is set in a reading mode or a recording medium when said device is set in a recording mode, selectively;
transporting means for transporting said original document or recording medium through said common path;
reading means disposed in said common path for optically reading said original document during said reading mode and also for detecting a condition of said recording medium being transported during said recording mode;
recording means disposed downstream of said reading means for recording said recording medium; and
processing means for processing an analog signal supplied from said reading means.

26. The device of claim 25 wherein said processing means includes a binary conversion circuit for converting said analog signal into a binary signal.

27. The device of claim 26 wherein said processing means further includes a central processing unit which includes a program for processing said binary signal in a accordance with a predetermined routine.

28. The device of claim 27 wherein said central processing unit also receives information as to whether said device is in said reading or recording mode.

29. The device of claim 26 wherein said processing means further includes selecting means for selecting said binary signal into a first kind or a second kind, a first central processing unit having a program to process said binary signal of said first kind and a second central processing unit having a program to process said binary signal of said second kind.

30. The device of claim 29 wherein said binary signal of said first kind corresponds to information read by said reading means during said reading mode and said binary signal of said second kind corresponds to information read by said reading means during said recording mode.

* * * * *